United States Patent
Masuda et al.

(10) Patent No.: US 10,148,518 B2
(45) Date of Patent: Dec. 4, 2018

(54) METHOD AND APPARATUS FOR MANAGING COMPUTER SYSTEM

(71) Applicant: FUJITSU LIMITED, Kawasaki-shi, Kanagawa (JP)

(72) Inventors: Yuu Masuda, Kobe (JP); Hisashi Tsujide, Takarazuka (JP); Yoshio Oki, Kobe (JP); Yoshihiro Kimura, Kobe (JP); Toshiyuki Utsumi, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 20 days.

(21) Appl. No.: 15/062,378

(22) Filed: Mar. 7, 2016

(65) Prior Publication Data

US 2016/0269246 A1    Sep. 15, 2016

(30) Foreign Application Priority Data

Mar. 9, 2015    (JP) ................................. 2015-045833

(51) Int. Cl.
*H04L 12/24* (2006.01)
*G06F 9/455* (2018.01)
*H04L 12/26* (2006.01)

(52) U.S. Cl.
CPC .......... *H04L 41/12* (2013.01); *G06F 9/45558* (2013.01); *H04L 43/12* (2013.01); *G06F 2009/45595* (2013.01)

(58) Field of Classification Search
None
See application file for complete search history.

(56) References Cited

U.S. PATENT DOCUMENTS

2005/0265356 A1    12/2005    Kawarai et al.
2007/0260721 A1*   11/2007    Bose ................... H04L 41/0806
                                                    709/223

(Continued)

FOREIGN PATENT DOCUMENTS

JP    2005-515541    5/2005
JP    2005-328318    11/2005

(Continued)

OTHER PUBLICATIONS

Japanese Office Action dated Oct. 16, 2018 for corresponding Japanese Patent Application No. 2015-045833, with English Translation, 6 pages.

*Primary Examiner* — Sithu Ko
(74) *Attorney, Agent, or Firm* — Fujitsu Patent Center

(57) ABSTRACT

A management apparatus transmits a plurality of probe packets with different hop count limits to a remote computer of interest. Then, on the basis of responses to the probe packets, the management apparatus produces path data that indicates a path from the management apparatus to the remote computer. The management apparatus obtains type data from the remote computer and intervening computers on the path to the remote computer. This type data indicates whether each of the remote computer and intervening computers is a physical computer or a virtual computer. When the type data indicates that the remote computer is a virtual computer, the management apparatus determines a host physical computer that is hosting the remote computer, on the basis of the type data and path data.

6 Claims, 20 Drawing Sheets

(56) References Cited

U.S. PATENT DOCUMENTS

| | | | | |
|---|---|---|---|---|
| 2013/0332602 A1* | 12/2013 | Nakil | ................... | G06N 99/005 |
| | | | | 709/224 |
| 2014/0129700 A1* | 5/2014 | Mehta | ................. | H04L 43/0817 |
| | | | | 709/224 |
| 2014/0297827 A1* | 10/2014 | Kikuchi | .............. | H04L 41/0869 |
| | | | | 709/223 |

FOREIGN PATENT DOCUMENTS

| | | |
|---|---|---|
| JP | 2008-172449 A | 7/2008 |
| JP | 2014-45437 | 3/2014 |
| WO | 03/060717 | 7/2003 |

* cited by examiner

FIG. 9

ICMP MESSAGE TYPES

| VALUE | VALUE DESCRIPTION | TYPE |
|---|---|---|
| 0 | Echo Reply (Response to Echo Request) | Reply |
| 3 | Destination Unreachable | Error |
| 8 | Echo Request | Request |
| 11 | Time Exceeded (e.g., TTL has become zero) | Error |

FIG. 15

91 NODE DATA

| Element Name | Parent Element | Element Description | Component Name | Component Type | Component Description | Data Type | # of |
|---|---|---|---|---|---|---|---|
| LogicalServer | - | Server node information | id | Attribute | Unique identifier | ID | 1 |
| | | | name | Attribute | CPU information | string | 0..1 |
| | | | nickname | Attribute | Nickname used to display partitions | string | 0..1 |
| | | | ipAddress | Attribute | IP address | string | 0..1 |
| | | | hostname | Attribute | Host Name. Equivalent to what is obtained with hostname command executed on a partition | string | 0..1 |
| | | | connectionType | Element | Communication method | - | 0..1 |
| | | | connectionport | Element | Communication port | - | 0..1 |
| LogicalServer-Configuration | LogicalServer | Configuration of server node | machineType | Attribute | Machine types: "PhysicalMachine" (physical server) "VirtualMachine" (virtual server) "Router" (router) | string | 0..1 |
| | | | LogicalCPU | Element | CPU INFORMATION | - | 0..* |
| LogicalCPU | LogicalServer-Configuration | CPU information | name | Attribute | CPU | string | 0..1 |
| | | | clock | Attribute | Clock Frequency (MHz) | long | 0..1 |
| | | | core | Attribute | The number of CPU cores | long | 0..1 |
| | | | status | Attribute | Other details of CPU | string | 0..1 |

FIG. 16

92 LINK DATA

| Element Name | Parent Element | Element Description | Component Name | Component Type | Component Description | Data Type | # of |
|---|---|---|---|---|---|---|---|
| NetworkConnection | : | Link Data | id | Attribute | Unique Identifier | ID | 1 |

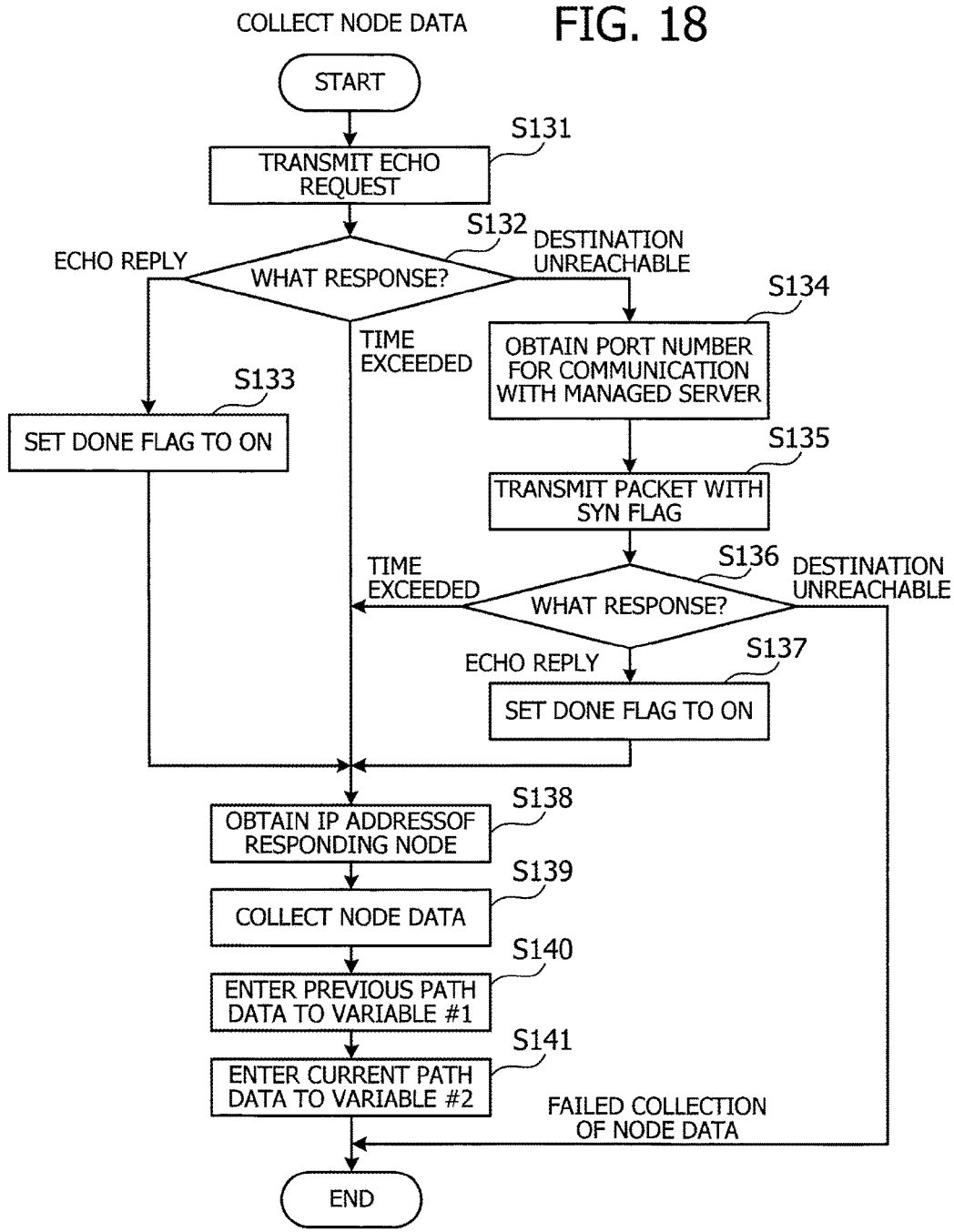

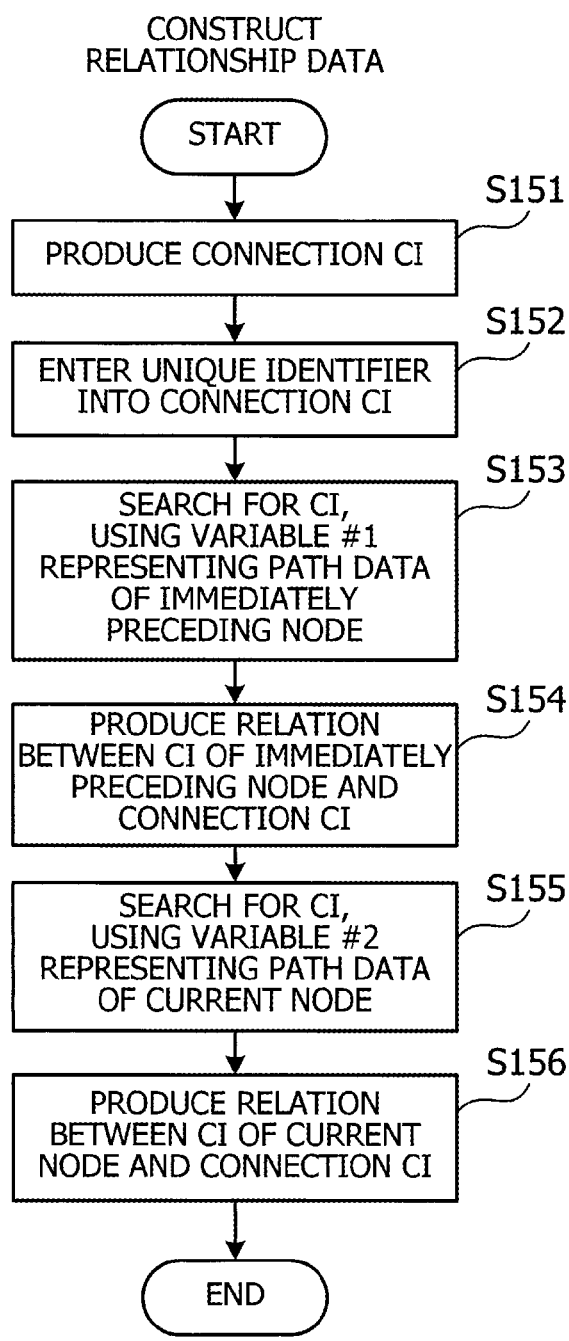

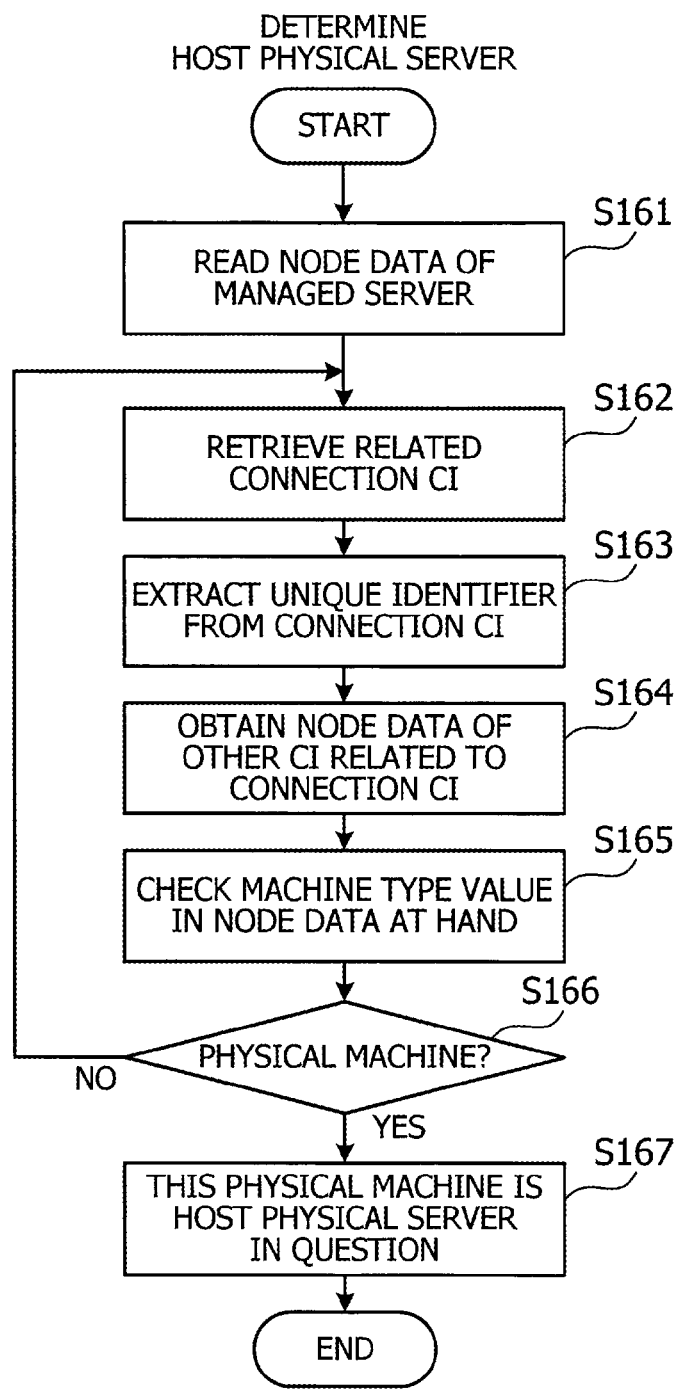

METHOD AND APPARATUS FOR MANAGING COMPUTER SYSTEM

CROSS-REFERENCE TO RELATED APPLICATION

This application is based upon and claims the benefit of priority of the prior Japanese Patent Application No. 2015-045833, filed on Mar. 9, 2015, the entire contents of which are incorporated herein by reference.

FIELD

The embodiments discussed herein relate to a method and apparatus for managing a computer system.

BACKGROUND

Some of the software programs used in a data center or other large-scale Information and Communication Technology (ICT) system are controlled by their respective licenses purchased from software venders. Such software can run on as many servers as granted by its license. For example, a license may specify the number of central processing unit (CPU) cores allowed to run the licensed software. The system may include a management server for the purpose of license management. When an application server in the system needs to run a particular software program, the management server collects information about the number of CPU cores using a network discovery technique and tests whether the license conditions for the program are satisfied. The application server can execute the program only when the license qualifies it to do so.

For successful discovery of CPU core counts, it is important to analyze the network structure of the server system. Recent ICT systems, however, use the virtualization technology in various areas, thus raising the need for discovery solutions that can work in virtual environments. For example, a technique is proposed for identifying the topology of a network in which virtual local area networks (VLAN) are constructed. Another proposed technique is to produce a network topology that indicates physical machines and virtual machines in a distinguishable manner. See, for example, the following documents: Japanese Laid-open Patent Publication No. 2005-328318; and Japanese Laid-open Patent Publication No. 2014-45437.

SUMMARY

In one aspect, there is provided a non-transitory computer-readable storage medium storing a program. This program causes a computer to perform a process including: transmitting a plurality of probe packets with different hop count limits to a remote computer of interest; producing path data that indicates a path from the computer to the remote computer, based on responses to the probe packets; obtaining type data from the remote computer and intervening computers on the path to the remote computer, the type data indicating whether each of the remote computer and intervening computers is a physical computer or a virtual computer; and determining a host physical computer that is hosting the remote computer, based on the type data and the path data, when the type data indicates that the remote computer is a virtual computer.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 illustrates some ICMP message types;
FIG. 15 illustrates an example of node data;
FIG. 16 illustrates an example of link data;
FIG. 18 is a flowchart illustrating an exemplary procedure of collecting node data;
FIG. 19 is a flowchart illustrating an exemplary procedure of constructing relationship data;
and
FIG. 20 is a flowchart illustrating an exemplary procedure of determining a host physical server.

DESCRIPTION OF EMBODIMENTS

Several embodiments of the present invention will be described below with reference to the accompanying drawings. These embodiments may be combined with each other unless they have contradictory features.

To run a licensed software program on a virtual computer, the number of CPU cores in the host physical computer of that virtual computer is tested against the license terms. One thing to consider here is that a running virtual computer may be migrated from its current host physical computer to another host physical computer through the process called live migration. This fact underscores the need for a technique of discovering the current host physical computer of a particular virtual computer.

Virtual computers are created and run by virtualization software. It is this virtualization software in the first place that knows which physical machine is hosting which virtual computer. However, various vendors provide different virtualization software products with their own different interfaces for information exchange. The user may sometimes be unable to reach his or her desired information when the specification of virtualization software is changed or a new virtualization program is introduced. Some virtualization products do not even provide a query interface, in which case it is not possible to ask them about host physical computers. For these reasons, the use of virtualization software as an information source is not always a good solution for topology discovery in the network including virtual computers.

(A) First Embodiment

Figure 1:
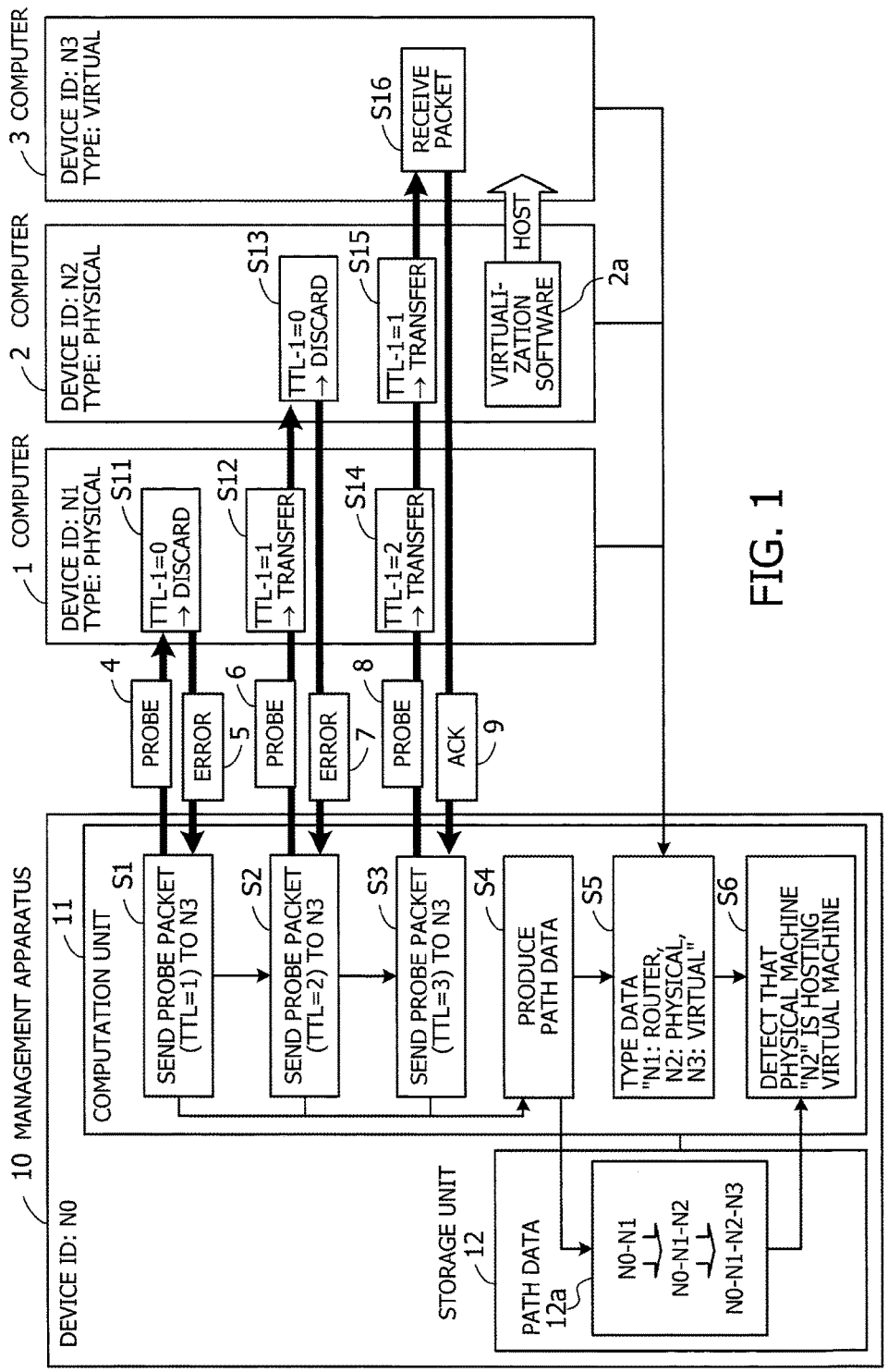
FIG. 1 illustrates an example of a system according to a first embodiment.

FIG. 1 illustrates an example of a system according to a first embodiment. The illustrated system includes a management apparatus 10 connected to three computers 1 to 3 (respectively referred to as first to third computers, where appropriate) via a network. The management apparatus 10 includes a computation unit 11 and a storage unit 12. In this example of FIG. 1, the first and second computers 1 and 2 are physical computers, while the third computer 3 is a virtual computer created by virtualization software 2a on the second computer 2. Each device connected to the network has its own distinctive device name. Specifically, the management apparatus 10 is named "N0," and the first computer 1 is named "N1." The second computer 2 and third computer 3 are respectively named "N2" and "N3."

Being a virtual computer, the third computer 3 may be moved from one physical computer to another through a process of, for example, live migration. This nature of virtual computers makes it difficult for other computers to determine on which physical computers they are currently running. The management apparatus 10 of the first embodiment is directed to this issue. Specifically, the computation unit 11 executes the following process to discover which physical computer is currently hosting the virtual computer 3.

The computation unit 11 first transmits a plurality of probe packets 4, 6, and 8 having different hop count limits toward the third computer 3 of interest (steps S1, S2, and S3). For example, these probe packets 4, 6, and 8 are all addressed to the same computer 3, but have different hop count limits with a step size of one. Hop count limit of a packet specifies how many times the packet can be transferred to the next node en route to its destination. Specifically, the noted hop count limits are set to the Time to Live (TTL) field of probe packets 4, 6, and 8. The type of probe packets 4, 6, and 8 may be, for example, SYN packets that request communication to begin.

The computers 1 to 3 may forward the probe packets 4, 6, and 8 to the next node or return a response, depending on their respective TTL values. Take the first probe packet 4 with TTL=1, for example. The computation unit 11 transmits it to the third computer 3 named "N0" (step S1). This probe packet 4 arrives at the first computer 1, and its TTL value is decremented by one upon receipt. Since the new TTL value is zero, the first computer 1 discards the probe packet 4 (step S11) and then returns an error response 5 back to the management apparatus 10.

The error response 5 arrives at the computation unit 11, indicating that the probe packet 4 has failed to reach its destination computer 3. The computation unit 11 thus transmits another probe packet 6 toward the same destination computer 3, but with TTL=2 (step S2). This second probe packet 6 reaches the first computer 1, and its TTL value is decremented by one at the first computer 1. Since the resulting new TTL value, one, is greater than zero, the first computer 1 forwards the second probe packet 6 to the second computer 2 (step S12). The second computer 2 decreases the TTL value of this second probe packet 6 by one. Since the new TTL value is zero, the second probe packet 6 is discarded by the second computer (step S13). The second computer 2 returns an error response 7 back to the management apparatus 10 since it has discarded the second probe packet 6.

The error response 7 means that the second probe packet 6 has failed to reach its destination computer 3. The computation unit 11 thus transmits yet another probe packet 8 to the same destination computer 3, but with TTL=3 (step S3). This third probe packet 8 reaches the first computer 1. The first computer 1 forwards the received third probe packet 8 to the second computer 2 after decrementing its TTL value by one (step S14). The second computer 2 similarly forwards the third probe packet 8 to the third computer 3 after decrementing its TTL value by one (step S15). The third computer 3 receives this third probe packet 8 since it is addressed thereto (step S16), and thus returns an acknowledgment 9 to the management apparatus 10 in reply to the third probe packet 8.

Through the above exchange of packets, the computation unit 11 has obtained three responses (two error responses 5 and 7 and one acknowledgment 9) from three computers 1 to 3. Based on these responses, the computation unit 11 produces path data 12a that indicates a specific network path from the management apparatus 10 to the third computer 3 (step S4). For example, the computation unit 11 draws a leg from a computer that has responded to a probe packet with TTL=n to a computer that has responded to a probe packet with TTL=(n+1), where n is an integer greater than zero. The computation unit 11 repeats this for different numbers of n, thereby producing a path to the intended computer.

More specifically, the management apparatus 10 receives a response from the first computer 1 as a result of the first probe packet 4 sent with a TTL value of one. This response means that the first computer 1 is immediately adjacent to the management apparatus 10, and thus the computation unit 11 produces a leg "N0-N1" as an initial part of path data 12a. The management apparatus 10 also receives a response from the second computer 2 as a result of the second probe packet 6 with a TTL value of two. This response means that the second computer 2 is next to the first computer 1, and thus the computation unit 11 updates the path data 12a to "N0-N1-N2" by adding a new leg. The management apparatus 10 further receives a response from the third computer 3 as a result of the third probe packet 8 with a TTL value of three. This response means that the destination computer 3 is next to the second computer 2, and thus the computation unit 11 updates the path data 12a to "N0-N1-N2-N3" by adding a final leg. The computation unit 11 then writes the produced path data 12a into, for example, the storage unit 12.

The path data 12a is produced in the above way on the basis of received responses to the probe packets 4, 6, and 8. The computation unit 11 now obtains type data of the computers 1 to 3 on the path to the third computer 3 (step S5). This type data indicates whether each of those computers is a physical machine or a virtual computer. For example, the computation unit 11 obtains type data by making access to each computer 1 to 3.

If the third computer 3 in question is found to be a virtual computer, then the computation unit 11 consults the above type data and path data 12a to determine which physical computer is hosting the third computer 3 as a virtual computer. For example, this determination is made on the fact that a virtual computer communicates with other computers via an interface provided on its host physical computer. The computation unit 11 searches for a physical computer nearest to the third computer 3 of all the intervening computers on its route. It is the second computer 2 that matches with this condition in the present example, and the computation unit 11 thus identifies the second computer 2 as hosting the third computer 3 in question (step S6).

The management apparatus 10 described above is capable of determining host physical computers without consulting the virtualization software 2a. Although a running virtual computer may move from one physical computer to another physical computer through the process of live migration, the management apparatus 10 is still able to transmit probe packets to that virtual computer as long as its network address, such as an Internet Protocol (IP) address, is known. Responses to these probe packets permit the management apparatus 10 to produce path data, obtain relevant type data, and finally identify the current host physical computer in question.

Specifically, the proposed management apparatus 10 is configured to send multiple probe packets to a particular managed computer of interest with successively different hop count limits, so that a response can be received from every computer on the path from the management apparatus 10 to the intended managed computer. Each of those responses contains an IP address or other information that identifies the responding computer. The reception of a response from every intervening computer therefore ensures proper production of a path that reaches the intended managed computer.

The computers may reject some types of packets due to security reasons while accepting other types. The latter types of packets are suitable for the purpose of probe packets 4, 6, and 8. For example, SYN packet requests a communication connection and is less likely to be rejected if the receiving computer is active. The use of SYN packets as probe packets 4, 6, and 8 thus ensures proper production of path data.

For example, the above-described computation unit 11 may be implemented as part of the functions provided by the processor of the management apparatus 10. The above-described storage unit 12 may be implemented as part of, for example, a memory in the management apparatus 10.

(B) Second Embodiment

A second embodiment will now be described below. The second embodiment is directed to determination of whether a managed server satisfies license conditions when executing some operational actions on that server via a network. For example, some classes of software licenses limit the number of servers that can execute the software under the license, depending on the total number of CPU cores in a physical server(s). Discovery techniques may be used to collect information about CPU cores, but what is actually obtained from virtual computers is the number of CPU cores that the virtualization software (e.g., hypervisor) has assigned to those virtual computers. Because this number does not purely represent how many CPU cores of the host physical computer are used to provide the virtual computers, the conventional discovery techniques are not suitable when virtual servers are concerned with the license in question. The second embodiment discussed below is therefore directed to how to identify a physical server hosting a managed virtual server, so as to obtain the number of CPU cores of that host physical server.

Figure 2:
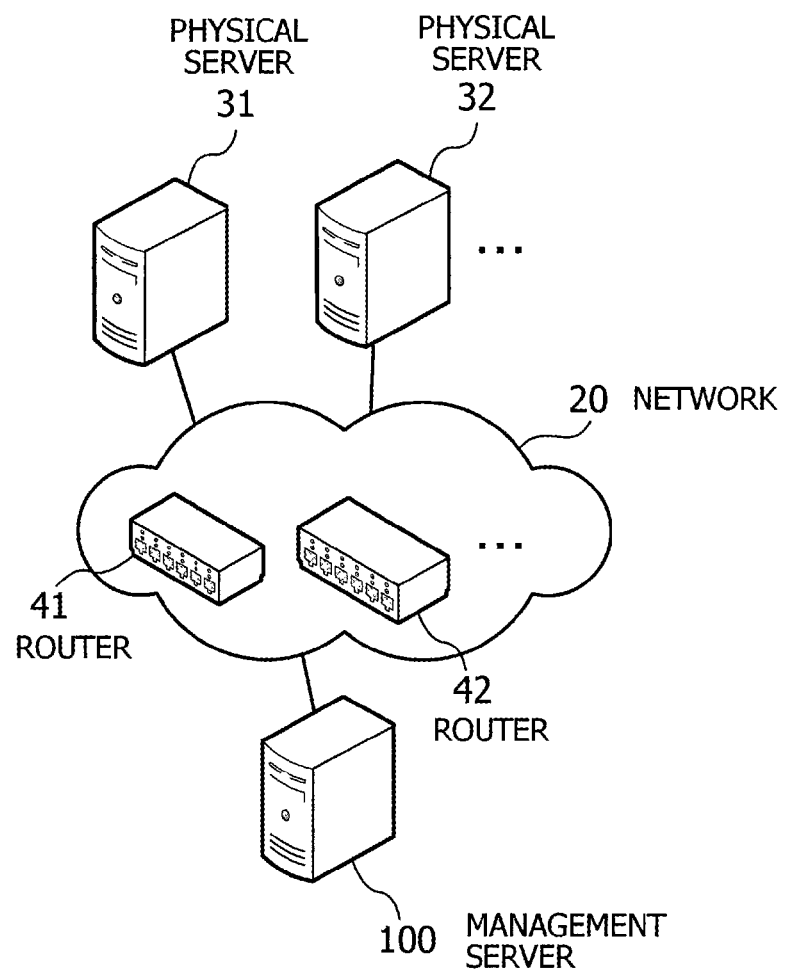
FIG. 2 illustrates an exemplary system configuration of a second embodiment.

FIG. 2 illustrates an exemplary system configuration of the second embodiment. The illustrated system includes a plurality of physical servers 31, 32, . . . connected to a network 20 including routers 41, 42, . . . for internetwork connection. Also connected to the network 20 is a management server 100 for management of the illustrated system as a whole. For example, the management server 100 manages the license of software that the physical servers 31, 32, . . . may execute. The license management tasks include control of software execution on managed servers under the license condition that, for example, limits the maximum number of CPU cores used in the managed servers.

Figure 3:
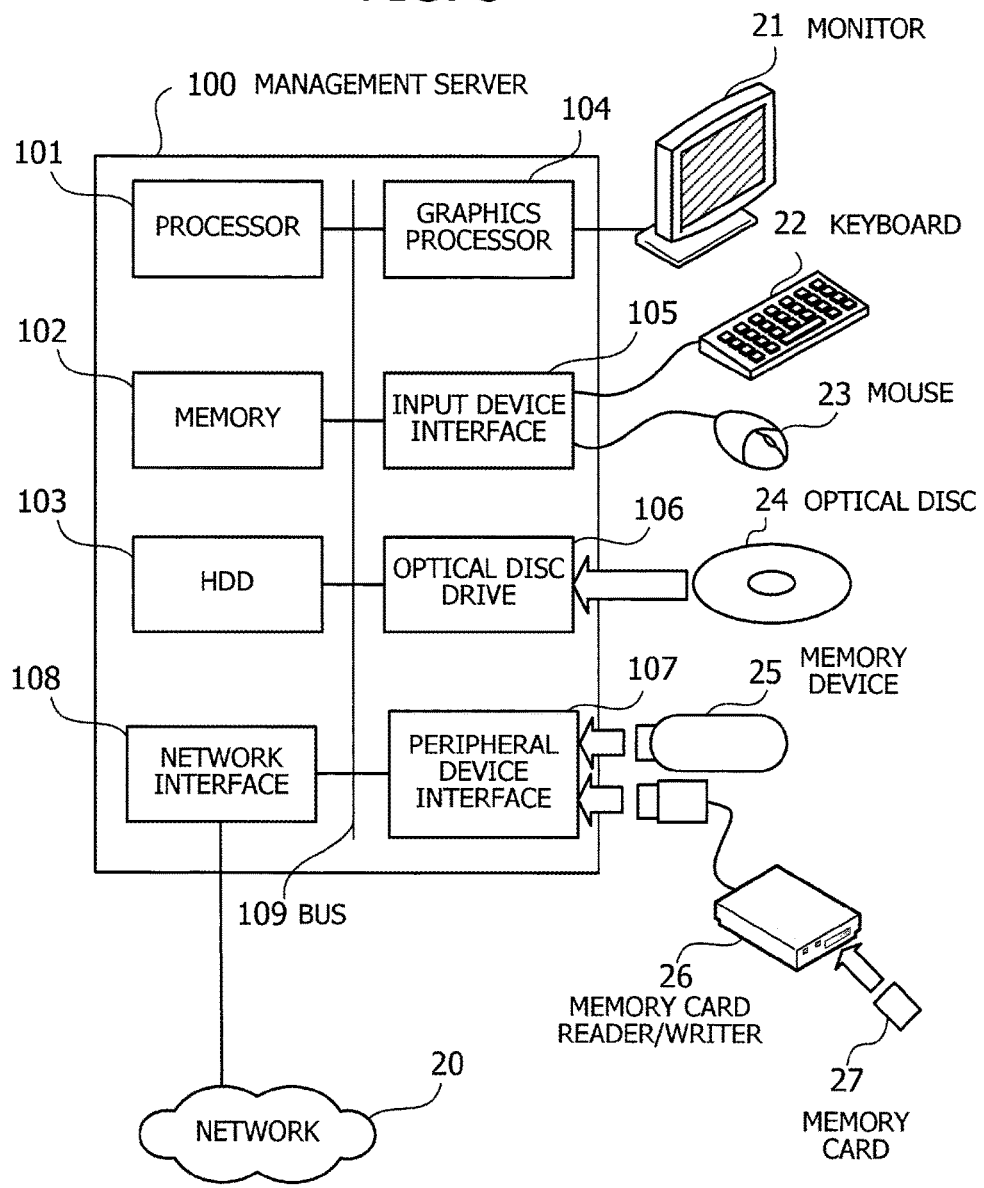
FIG. 3 illustrates an exemplary hardware configuration of a management server according to the second embodiment.

FIG. 3 illustrates an exemplary hardware configuration of a management server according to the second embodiment. The illustrated management server 100 has a processor 101 to control its entire operation. The processor 101 is coupled to a memory 102 and other various devices and interfaces on a bus 109. The processor 101 may be a single processing device or a multiprocessor system including two or more processing devices, such as a CPU, micro processing unit (MPU), or digital signal processor (DSP). It is also possible to implement processing functions of the processor 101 wholly or partly with an application-specific integrated circuit (ASIC), programmable logic device (PLD), or other electronic circuits, or any combination of them.

The memory 102 serves as the primary storage device of the management server 100. Specifically, the memory 102 is used to temporarily store at least some of the operating system (OS) programs and application programs that the processor 101 executes, as well as other various data objects that it manipulates at runtime. The memory 102 may be implemented by using volatile semiconductor memory devices such as random access memory (RAM) chips.

Other devices on the bus 109 include a hard disk drive (HDD) 103, a graphics processor 104, an input device interface 105, an optical disc drive 106, a peripheral device interface 107, and a network interface 108.

The HDD 103 writes and reads data magnetically on its internal platters. The HDD 103 serves as a secondary storage device of the management server 100 to store program files and data files of the operating system and applications. Other possible secondary storage devices include Solid State Drives (SSD) using non-volatile flash memory devices.

The graphics processor 104, coupled to a monitor 21, produces video images in accordance with drawing commands from the processor 101 and displays them on a screen of the monitor 21. The monitor 21 may be, for example, a cathode ray tube (CRT) display or a liquid crystal display.

The input device interface 105 is connected to input devices such as a keyboard 22 and a mouse 23 and supplies signals from those devices to the processor 101. The mouse 23 is a pointing device, which may be replaced with other kind of pointing devices, such as a touchscreen, tablet, touchpad, and trackball.

The optical disc drive 106 reads out data encoded on an optical disc 24, by using laser light. The optical disc 24 is a portable data storage medium, the data recorded on which can be read as a reflection of light or the lack of the same. The optical disc 24 may be a digital versatile disc (DVD), DVD-RAM, compact disc read-only memory (CD-ROM), CD-Recordable (CD-R), or CD-Rewritable (CD-RW), for example.

The peripheral device interface 107 is a communication interface used to connect peripheral devices to the management server 100. For example, the peripheral device interface 107 may be used to connect a memory device 25 and a memory card reader/writer 26. The memory device 25 is a data storage medium having a capability to communicate with the peripheral device interface 107. The memory card reader/writer 26 is an adapter used to write data to or read data from a memory card 27, which is a data storage medium in the form of a small card.

The network interface 108 is connected to a network 20 so as to exchange data with other computers or network devices (not illustrated).

The above-described hardware platform may be used to implement the processing functions of the second embodiment. The same hardware configuration of the management server 100 of FIG. 3 may similarly be applied to the foregoing management apparatus 10 of the first embodiment.

The management server 100 provides various processing functions of the second embodiment by executing programs stored in a non-transitory computer-readable storage medium, for example. These processing functions are encoded in the form of computer programs, which may be stored in a variety of media. For example, the management server 100 may store its program files in its HDD 103. The processor 101 reads at least part of program and data files stored in the HDD 103 and executes programs after loading them on the memory 102. Other possible storage locations for the programs include optical discs 24, memory devices 25, memory cards 27, and other portable storage media. The programs stored in a portable storage medium are installed in the HDD 103 under the control of the processor 101, so that they are ready to execute upon request. It may also be possible for the processor 101 to execute program codes read out of a portable storage medium, without installing them in its local storage devices.

Figure 4:
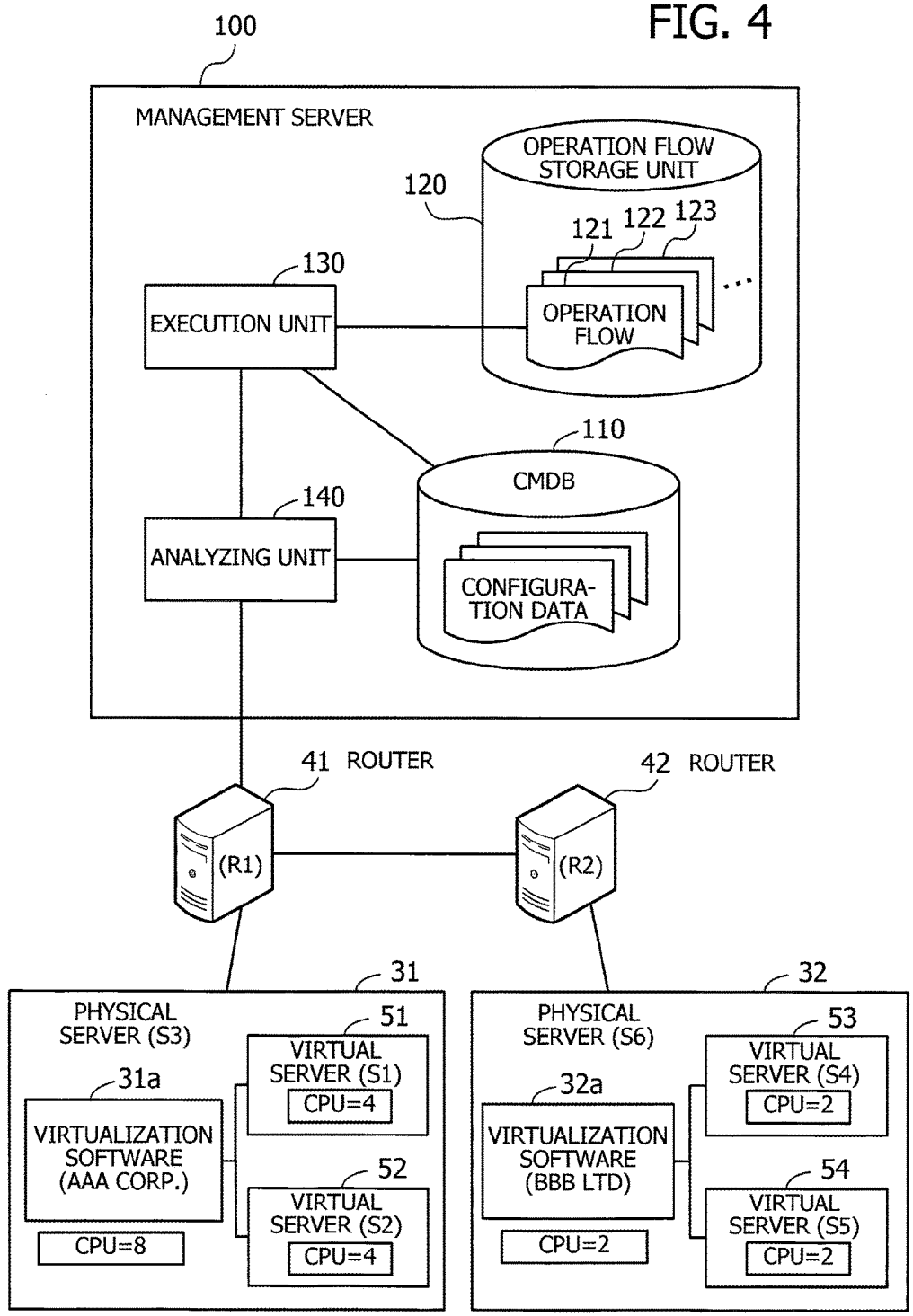
FIG. 4 is a block diagram illustrating functions of the management server.

FIG. 4 is a block diagram illustrating functions of the management server. The management server 100 illustrated in the upper half of FIG. 4 includes a configuration management database (CMDB) 110, an operation flow storage unit 120, an execution unit 130, and an analyzing unit 140.

The CMDB 110 is a database for managing information about the configuration of an ICT system. Specifically, the CMDB 110 contains information describing each Configuration Item (CI) and relationships between the CIs. The stored CIs include system information of network nodes, machine type (i.e., physical machine or virtual machine) of each node, and relationships between different nodes. Servers with a machine type of "physical machine" are called "physical servers," and those with a machine type of "virtual machine" are called "virtual servers." The CMDB 110 may be implemented as part of the storage space of, for example, the memory 102 or HDD 103.

The operation flow storage unit 120 provides a storage space for two or more operation flows 121, 122, 123, ..., which describe specific procedures for managing the system. Specifically, each operation flow 121, 122, 123, ... includes the host name, IP address, user ID and password, communication protocol, and other information about each server to be managed. The operation flow storage unit 120 may be implemented as part of the storage space of, for example, the memory 102 or HDD 103.

The execution unit 130 executes a procedure described in one of the operation flows 121, 122, 123, ... in the operation flow storage unit 120, consulting the CMDB 110 when it is needed during the execution. When the intended procedure is about management of a particular piece of software, the execution unit 130 executes it within the scope of a license that is owned for that piece of software. For example, the execution unit 130 requests the analyzing unit 140 to provide information about a physical server that is executing the software of interest. Then based on this physical server information received from the analyzing unit 140, the execution unit 130 recognizes the number of CPU cores in the concerned physical server and tests whether the software is executed within the license limit. If this test returns true, then the execution unit 130 executes the intended procedure for the software according to the operation flow.

The analyzing unit 140 analyzes the topology of the network 20 in response to the request noted above. For example, the analyzing unit 140 obtains node data from each network node on the communication path to a specific managed server of interest and updates the CMDB 110 with the obtained data. Based on this node data, the analyzing unit 140 determines whether the managed server of interest is a physical server or virtual server. If it is a virtual server, the analyzing unit 140 further analyzes which physical server is hosting that virtual server.

Referring to the example of FIG. 4, a first physical server 31 is connected to the management server 100 via a router 41. A second physical server 32 is also connected to the management server 100 via two routers 41 and 42. These routers 41 and 42 have their respective host names "R1" and "R2."

The first and second physical servers 31 and 32 have virtualization software 31a and 32a installed previously. The first physical server 31 uses its virtualization software 31a to create virtual servers 51 and 52. Likewise, the second physical server 32 uses its virtualization software 32a to create virtual servers 53 and 54. All the physical and virtual servers are designated by different host names. That is, the first physical server 31 is named "S3" and its virtual servers 51 and 52 are named "S1" and "S2," respectively. The second physical server 32 is named "S6" and its virtual servers 53 and 54 are named "S4" and "S5," respectively.

The first physical server 31 contains an 8-core CPU, and the second physical server 32 a 2-core CPU. To do some operational action for the virtual servers 51 and 52 running on the first physical server 31, the license for these servers has to allow such actions to be performed with eight CPU cores. Similarly, to do some operational action for the virtual servers 53 and 54 running on the second physical server 32, the license for these servers has to allow such actions to be performed with two CPU cores.

The procedure of operational actions for the virtual servers 51 to 54 is described in individual operation flows 121, 122, 123, ..., and the management server 100 takes care of the system on the basis of them. It is noted that the lines interconnecting the functional blocks in FIG. 4 represent some of their communication paths. The person skilled in the art would appreciate that there may be other communication paths in actual implementations. It is also noted that each functional block in FIG. 4 may be implemented as a program module for execution by a computer(s).

Figure 5:
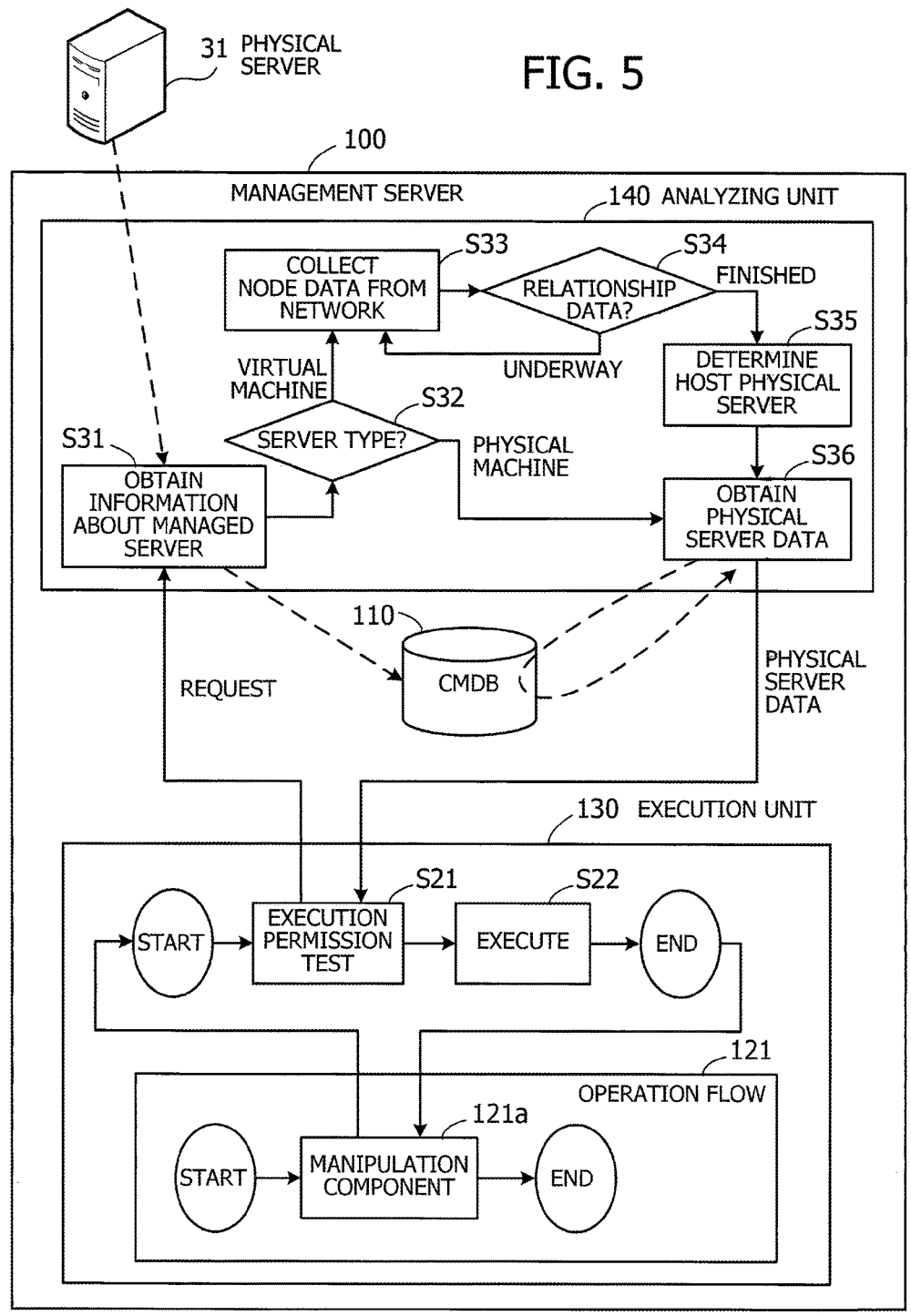
FIG. 5 illustrates an example of a system management procedure in accordance with an operation flow.

FIG. 5 illustrates an example of a system management procedure in accordance with an operation flow. The execution unit 130 loads an operation component 121a described in an operation flow 121. For example, this operation component 121a specifies a managed server and describes what processing service to execute for that server. When the operation component 121a is loaded, the execution unit 130 conducts a process called "execution permission test" (step S21) to confirm the presence of an appropriate license that permits the managed server to receive maintenance management services and the like. Suppose that, for this test, the execution unit 130 needs to know the number of CPU cores used in the managed server. The execution unit 130 thus requests the analyzing unit 140 to obtain physical server data. The execution unit 130 recognizes the number of CPU cores in the managed server on the basis of physical server data obtained via the analyzing unit 140 and determines whether the number is satisfactory in terms of the license. When the license conditions are satisfied, the execution unit 130 determines that it is allowed to execute the operation component 121a for the managed server. The execution unit 130 then executes what is described in the operation component 121a (step S22).

When the request issued in step S21 for physical server data is received from the execution unit 130, the analyzing unit 140 first obtains data about the managed server specified in the request (step S31). For example, if the managed server is the first physical server 31, the analyzing unit 140 obtains information about the first physical server 31 itself. If it is a virtual server running on the first physical server 31, the analyzing unit 140 obtains information about that virtual server. Based on the obtained information, the analyzing unit 140 determines whether the managed server is a virtual server or a physical server (step S32). When the managed server is found to be a virtual server, the analyzing unit 140 collects data about nodes on the network path reaching that virtual server, and constructs relationship data from the obtained node data so as to indicate relationships between the nodes (step S33). The analyzing unit 140 determines whether the relationship data has been finished (step S34). When it is still underway, the analyzing unit 140 goes back and adds new node data. When the inter-node relationship data is finished, the analyzing unit 140 uses it to determine which physical server is hosting the virtual server of interest (step S35). The analyzing unit 140 then retrieves physical server data of the identified physical server from the CMDB 110 and sends it to the execution unit 130 (step S36).

Figure 6:
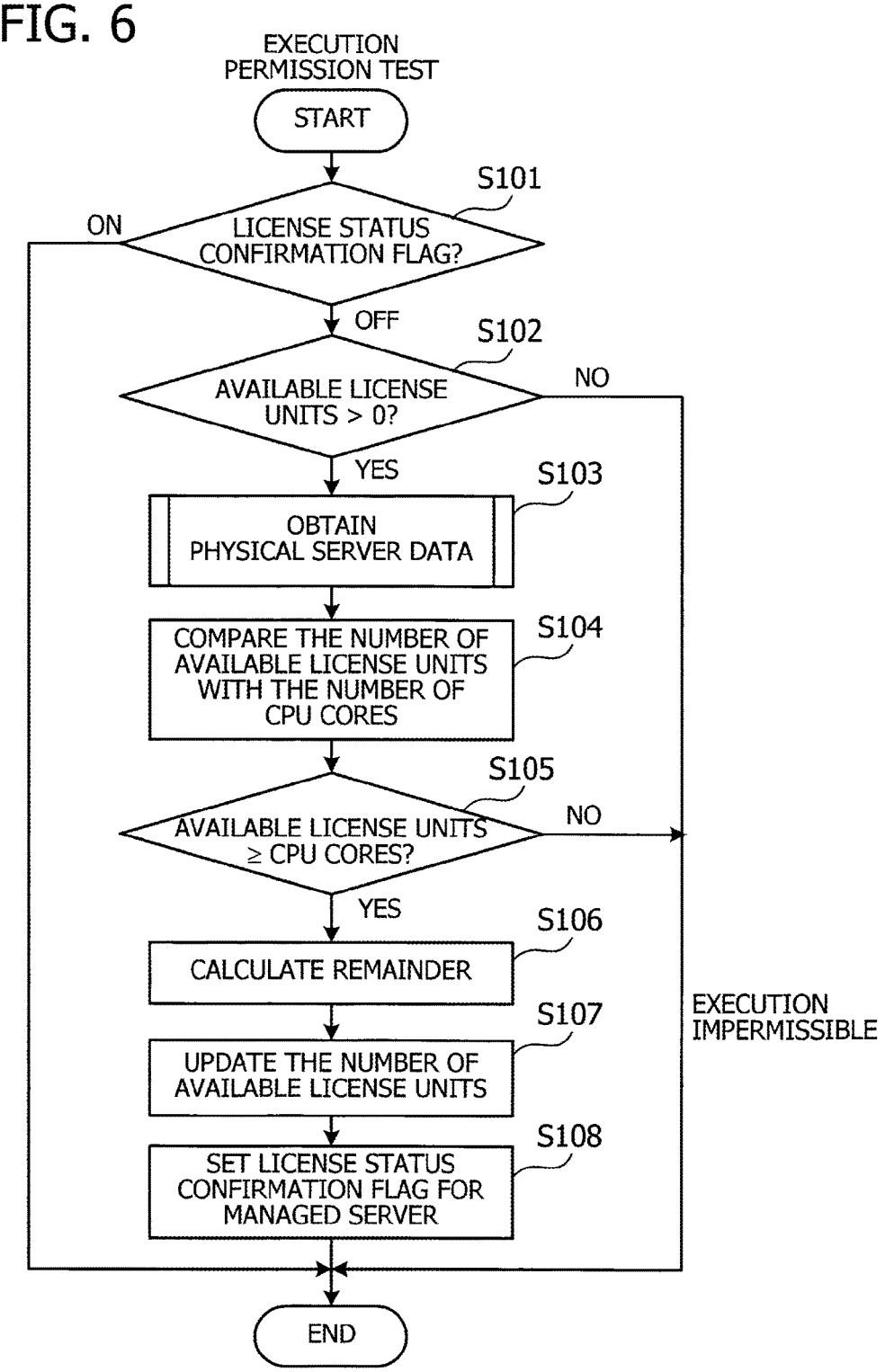
FIG. 6 is a flowchart illustrating an example of a detailed procedure of execution permission test.

FIG. 6 is a flowchart illustrating an example of a detailed procedure of execution permission test.

(Step S101) The execution unit 130 determines whether a license status confirmation flag for the managed server is ON or OFF. This license status confirmation flag indicates whether the managed server specified in the current operation flow has a license to receive services. For example, such license status confirmation flags are stored in the memory 102, each associated with an individual server's identifier (e.g., host name or IP address). When the license status confirmation flag of the managed server is ON, the procedure of execution permission test is terminated. When the license status confirmation flag is OFF, the process advances to step S102.

(Step S102) The execution unit 130 determines whether the number of available license units is greater than zero. The term "number of available licenses" means the number of CPU cores allowed by the license terms minus the number of CPU cores currently used by the managed server whose license status flag is ON. A variable has previously been declared to contain this number. If the number of available license units is greater than zero, the process advances to step S103. Otherwise, the process of execution permission test is terminated, concluding that the execution in the managed server is against the license and thus impermissible.

(Step S103) The execution unit 130 requests the analyzing unit 140 to obtain physical server data. In response, the analyzing unit 140 obtains and supplies physical server data. Details of this process will be described later.

(Step S104) The execution unit 130 compares the number of available license units with the number of CPU cores indicated in the obtained physical server data.

(Step S105) The execution unit 130 compares the number of available license units with the number of CPU cores. If the number of available license units is greater than or equal to the number of CPU cores, the process advances to step S106. If the number of available license units is smaller than the number of CPU cores, the process of execution permission test is terminated, concluding that the execution in the managed server is against the license and thus impermissible.

(Step S106) The execution unit 130 calculates a remainder by subtracting the obtained number of CPU cores from the number of available license units.

(Step S107) The execution unit 130 updates the number of available license units with the remainder calculated at step S106. For example, the execution unit 130 substitutes the remainder for the aforementioned variable representing the number of available license units.

(Step S108) The execution unit 130 sets the license status confirmation flag to ON for the managed server.

In the way described above in FIGS. 5 and 6, the management server 100 executes what is described in an operation flow for a managed server of interest within the scope of the license. When the managed server is a virtual server, the analyzing unit 140 identifies its host physical server and obtains physical server data, including the number of CPU cores, from that server. The next part of the description will provide details of how to determine such a host physical server. Note that the following description may use the word "deploy" or "provision" to mean the act of causing a physical server to host a virtual server.

The analyzing unit 140 achieves host physical server determination by investigating a network path from the management server 100 to the managed server of interest, without the need for creating a large topology map of the entire network. For example, the analyzing unit 140 uses the framework of TTL, the parameter representing each packet's lifetime in the Internet Control Message Protocol (ICMP), so as to find a network path reaching a managed virtual server. TTL indicates how long the packet can exist in the network. When a packet is received, the receiving node decrements its TTL field by one and, if the result is zero, discards the packet without forwarding it to its destination.

When the network path is obtained, the analyzing unit 140 then collects data about nodes along that path and constructs data indicating inter-node relationships on the basis of the collected node data. The constructed relationship data permits the analyzing unit 140 to determine which physical server is hosting the managed virtual server of interest, without consulting the virtualization software.

Figure 7:
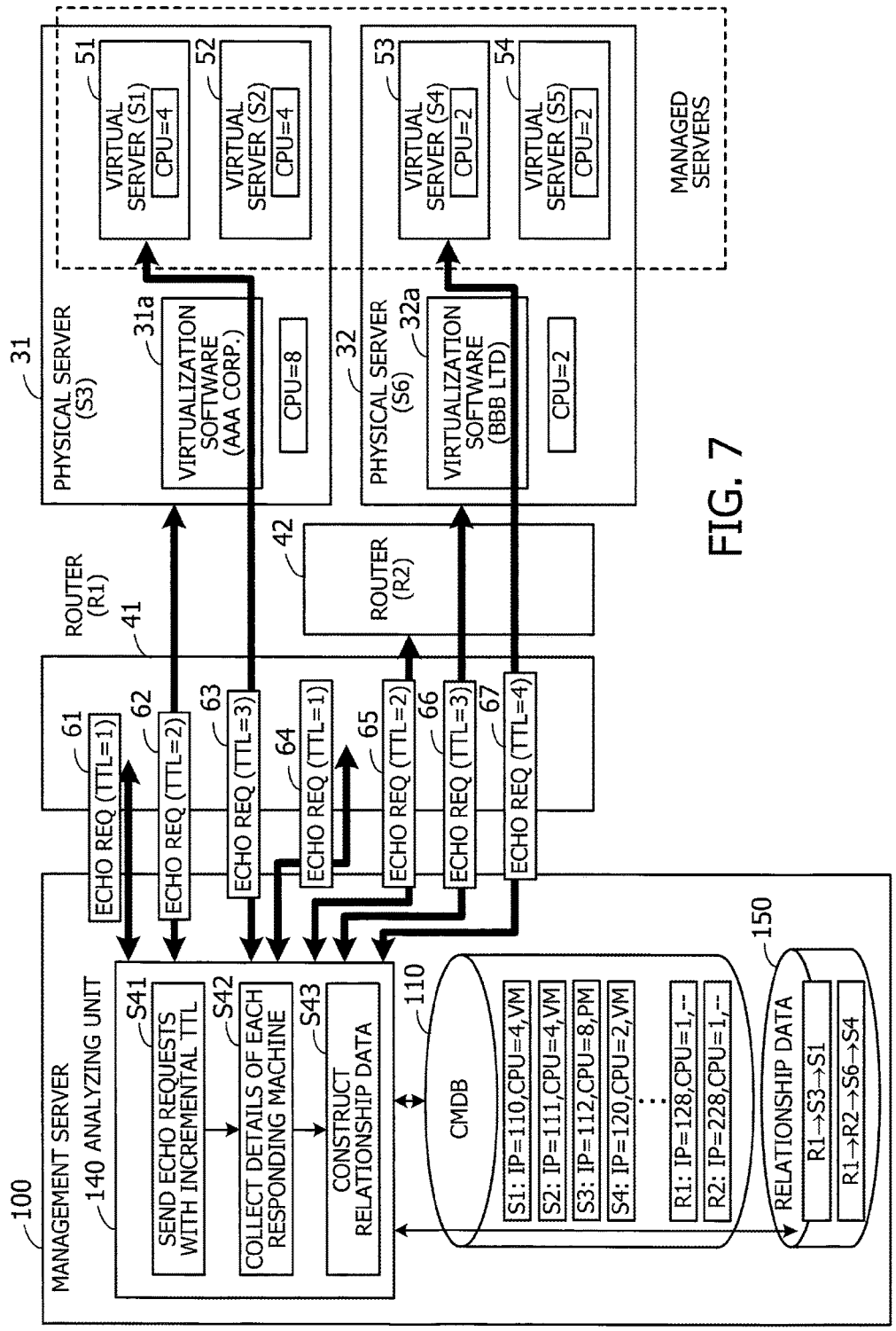
FIG. 7 illustrates an example of how the management server finds out a host physical server of a virtual server.

FIG. 7 illustrates an example of how the management server finds out a host physical server of a virtual server. The illustrated management server 100 knows IP addresses of virtual servers 51 to 54, but has no specific information about what network nodes currently exist on the paths to those virtual servers 51 to 54. Although FIG. 7 illustrates two physical servers 31 and 32 (referred to as first and second physical servers), the management server 100 is not aware of those physical servers on which the virtual servers 51 to 54 are deployed.

Theoretically, it is possible to obtain information about the virtual servers 51 to 54 by sending queries to virtualization software 31a and 32a running in the first and second physical servers 31 and 32. However, the virtualization software 31a and 32a may be from different vendors (AAA Corporation and BBB LTD in the example of FIG. 4) and thus have their proprietary interfaces for such queries from other servers. For example, queries to the former virtualization software 31a offers a command interface stipulated by AAA Corporation. But this interface is different from the one offered by the latter virtualization software 32*a* from BBB LTD. The management server 100 would have to adapt itself to each vendor's proprietary interface in order to make such queries possible. Some virtualization software products do not even provide such query interfaces, in which case the management server 100 would be unable to ask them about the physical server in question.

In view of the above, the second embodiment is configured to identify host physical servers without relying on virtualization software. For example, the second embodiment achieves this by taking advantage of the fact that communication between the management server 100 and each virtual server 51 to 54 is always via an interface of the latter's host physical server 31 and 32. Specifically, the proposed management server 100 searches the path to a virtual server for physical servers located thereon, and selects one of those physical servers that is closest to the virtual server. This selected server is deemed to be hosting the virtual server of interest.

Suppose now that the execution unit 130 executes an operation flow for providing services to each of the virtual servers 51 to 54 as managed servers. The execution unit 130 first requests the analyzing unit 140 to obtain physical server data relating to those managed servers. Specifically, the execution unit 130 extracts the IP address, user ID, password, communication protocol, and other information about each managed server from the operation flow and provides them to the analyzing unit 140 as part of a request for physical server data. These pieces of information from the execution unit 130 enable the analyzing unit 140 to set up a connection with the managed servers and determine whether each managed server is a virtual server or a physical server or a router.

More specifically, the analyzing unit 140 tries to make a connection with individual managed servers by transmitting multiple echo requests 61 to 67 with successively larger TTL values (i.e., TTL=1, 2, 3 . . . ) toward each intended virtual server 51 to 54 (step S41). Since these echo requests 61 to 67 can only be transferred as many times as their respective TTL values, the intervening nodes before the destination discard some of those request packets and return an error response. When an echo request reaches its destination, the receiving server returns an echo reply to acknowledge the receipt. The management server 100 thus expects to receive responses from every intervening node on the path, as well as from every intended managed server.

Referring to the example of FIG. 7, three echo requests 61 to 63 are addressed to one virtual server 51. Based on the responses to these requests, the analyzing unit 140 recognizes the presence of a router 41 and a physical server 31 on the path to the virtual server 51 of interest. Similarly, four echo requests 64 to 67 are addressed to another virtual server 53, and based on the responses to these requests, the analyzing unit 140 recognizes the presence of two routers 41 and 42 and one physical server 32 on the path to the virtual server 53 of interest.

Now that it has learned what machines lie on the path to each managed server, the analyzing unit 140 collects detailed information about these machines (step S42). The collected details accumulate in the CMDB 110. For example, they include the following information about each responding node: node name, IP address, the number of CPU cores, and machine type. The machine type information indicates whether the machine is a virtual machine (VM) or a physical machine (PM).

The analyzing unit 140 further analyzes the responses to echo requests and constructs relationship data 150 that represents node-to-node connections (step S43). For example, on the basis of responses to the first three echo requests 61 to 63, the analyzing unit 140 constructs a record "R1→S3→S1" representing network connections from the router 41 to the first physical server 31 and further from the first physical server 31 to the virtual server 51. The relationship data 150 including such records is stored in the memory 102 or HDD 103.

The CMDB 110 has been updated with the current system configuration, and the relationship data 150 has been constructed to represent inter-node connections in the way described above. The execution unit 130 consults this updated CMDB 110 to determine the machine type of each managed server. If one of the managed servers turns out to be a virtual server, then the execution unit 130 consults the relationship data 150 to find a physical server located immediately before the managed virtual server. The execution unit 130 consults again the CMDB 110 to check the number of CPU cores in the found physical server, thereby determining whether to execute an operation flow for that managed server.

Figure 8:
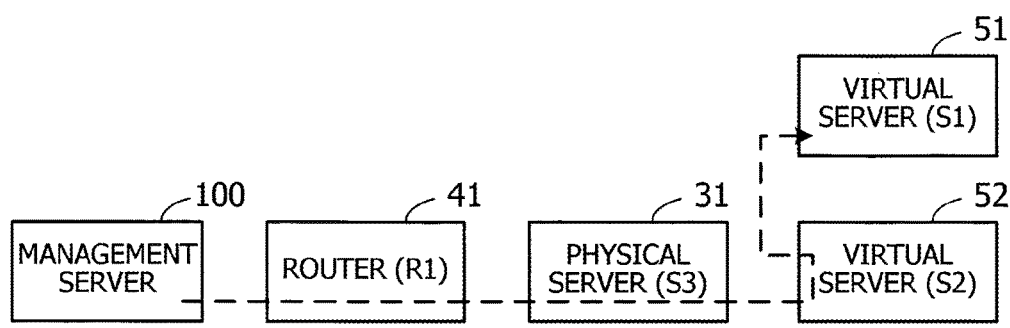
FIG. 8 is an example of a multi-level virtual server configuration.

The above procedure of FIG. 7 is an exemplary case of virtual servers running on a physical server. However, there may actually be a virtual server hosted by a parent virtual server. Note that the same procedure of FIG. 7 may similarly work well to identify an underlying physical server of such virtual servers. FIG. 8 is an example of a multi-level virtual server configuration. A virtual server 51 is connected to the illustrated network via another virtual server 52. In this example, the network path from the management server 100 to the former virtual server 51 includes the latter virtual server 52 as an intervening node. It is noted, however, that there has always to be a physical server 31 before the intervening virtual server 52. The management server 100 can identify this host physical server 31 by testing the machine type of each node on the path to the virtual server 51.

As discussed above, a transmitted echo request may reach its destination or may be discarded before reaching the destination, depending on its TTL value. The sender can know this delivery status of each echo request by determining the type of response messages. FIG. 9 illustrates some ICMP message types. ICMP messages have a specific value in their header field to indicate what type of control messages they are. For example, the value "0" falls into the "Reply" message type and specifically indicates an "Echo Reply" message sent in response to an echo request. The value "3" falls into the "Error" message type and specifically indicates a "Destination Unreachable" status of a transmitted message. The value "8" falls into the "Request" message type and specifically indicates an "Echo Request" message. The value "11" falls into the "Error" message type and specifically indicates a "Time Exceeded" status of a transmitted message.

Figure 10:
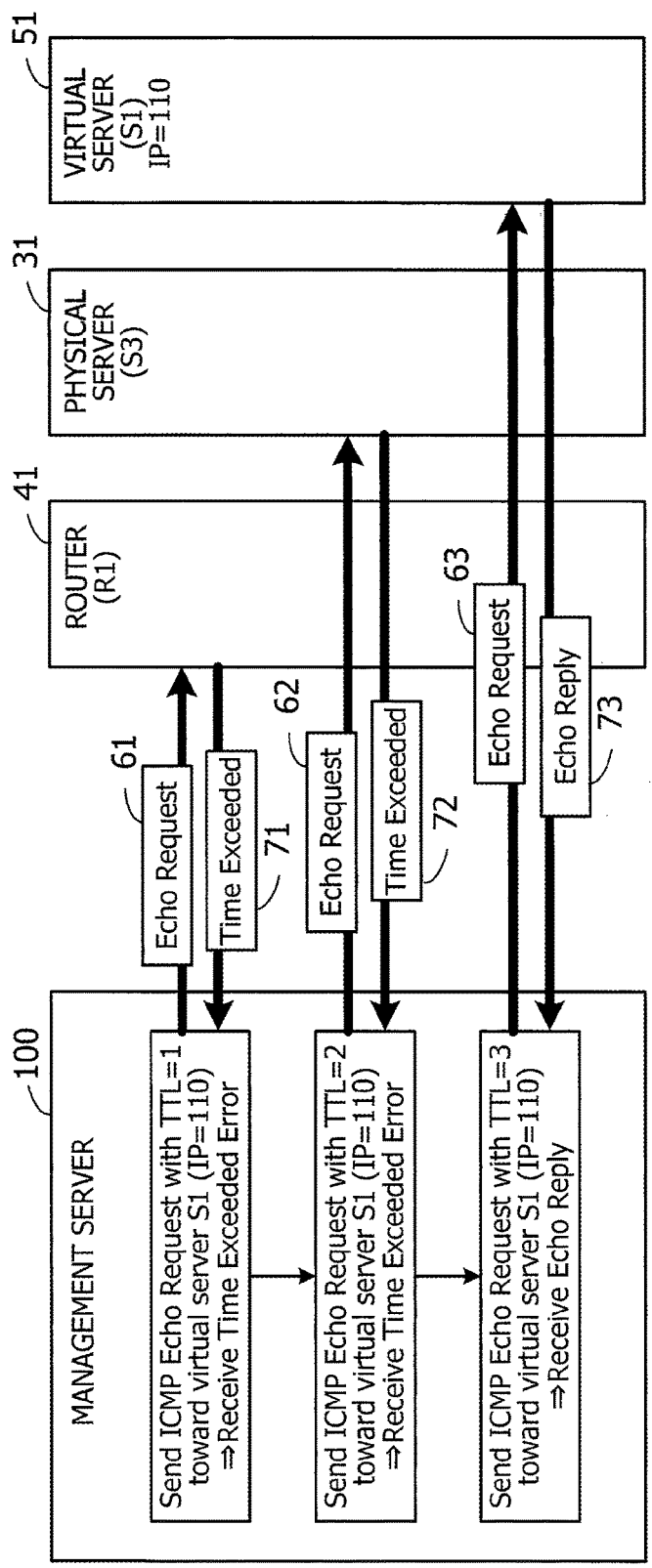
FIG. 10 illustrates an example of responses to an echo request.

FIG. 10 illustrates an example of responses to an echo request. Suppose that the management server 100 is about to apply an operational action to a particular virtual server 51. To obtain IP addresses of intervening machines residing between the management server 100 and the virtual server 51 of interest, the analyzing unit 140 transmits an IP packet with TTL=1 toward the virtual server 51, carrying an ICMP echo request 61. There are two intervening machines as seen in FIG. 10. The first intervening machine is a router 41, immediately next to the management server 100. This router 41 decrements TTL in the IP header by one. The resulting zero-valued TTL causes the router 41 to discard the echo request 61 and send an error response 71 ("Time Exceeded")

back to the management server 100. The analyzing unit 140 in the management server 100 checks and extracts the source IP address from the packet of this error response 71.

Since the first echo request 61 has ended up with an error response 71 indicating "Time Exceeded," the analyzing unit 140 transmits another ICMP echo request 62 toward the same virtual server 51, with a TTL value incremented by one, after having collected detailed machine information and constructing relationship data representing network connections about the router 41. This second echo request 62 with TTL=2 is transferred from the router 41 to a physical server 31 as the next intervening machine. The physical server 31 discards the second echo request 62 because it sees the TTL value become zero. After that, the physical server 31 transmits an error response 72 ("Time Exceeded") back to the management server 100. The analyzing unit 140 in the management server 100 checks and extracts the source IP address from the packet of this error response 72.

The analyzing unit 140 then transmits yet another echo request 63 with TTL=3 toward the same virtual server 51. This third echo request 63 reaches the intended virtual server 51 via the router 41 and physical server 31. The virtual server 51 recognizes that the third echo request 63 is addressed to itself and thus returns an echo reply 73. This echo reply 73 permits the analyzing unit 140 to check and extract the IP address of the virtual server 51 of interest.

As in the above example, the management server 100 repeats transmitting an echo request while increasing TTL until an echo reply is received. By doing so, the management server 100 is able to obtain IP addresses of intervening machines on the path to a managed server.

Some intervening machines may, however, be configured by default to stay silent to ICMP probing because of increased security concerns. The foregoing method would not be able to obtain IP addresses of these machines because it is based on the ICMP alone. To address this difficulty, the management server 100 of the second embodiment is designed to detect the presence of an ICMP-silent machine on the route to an intended managed server when no Time Exceeded error is returned in spite of transmission of an ICMP request addressed to the managed server. When this situation happens, the management server 100 recognizes that the ICMP probing does not work well and thus transmits a Transmission Control Protocol (TCP) packet with a SYN flag set, toward an appropriate port of the protocol (e.g., Secure Shell, or SSH) that the management server 100 is intended to use in its operational action for the managed server. This TCP packet is called "SYN packet," and the management server 100 uses it along with the TTL mechanism. That is, the management server 100 transmits a series of SYN packets to the managed server of interest, while successively increasing TTL values as in TTL=1, 2, 3 and so on. Each intervening machine decrements the TTL value by one before transferring SYN packets to the next node. When the TTL of a SYN packet reaches zero at a certain machine, an ICMP reply message is sent from that machine to the management server 100.

Figure 11:
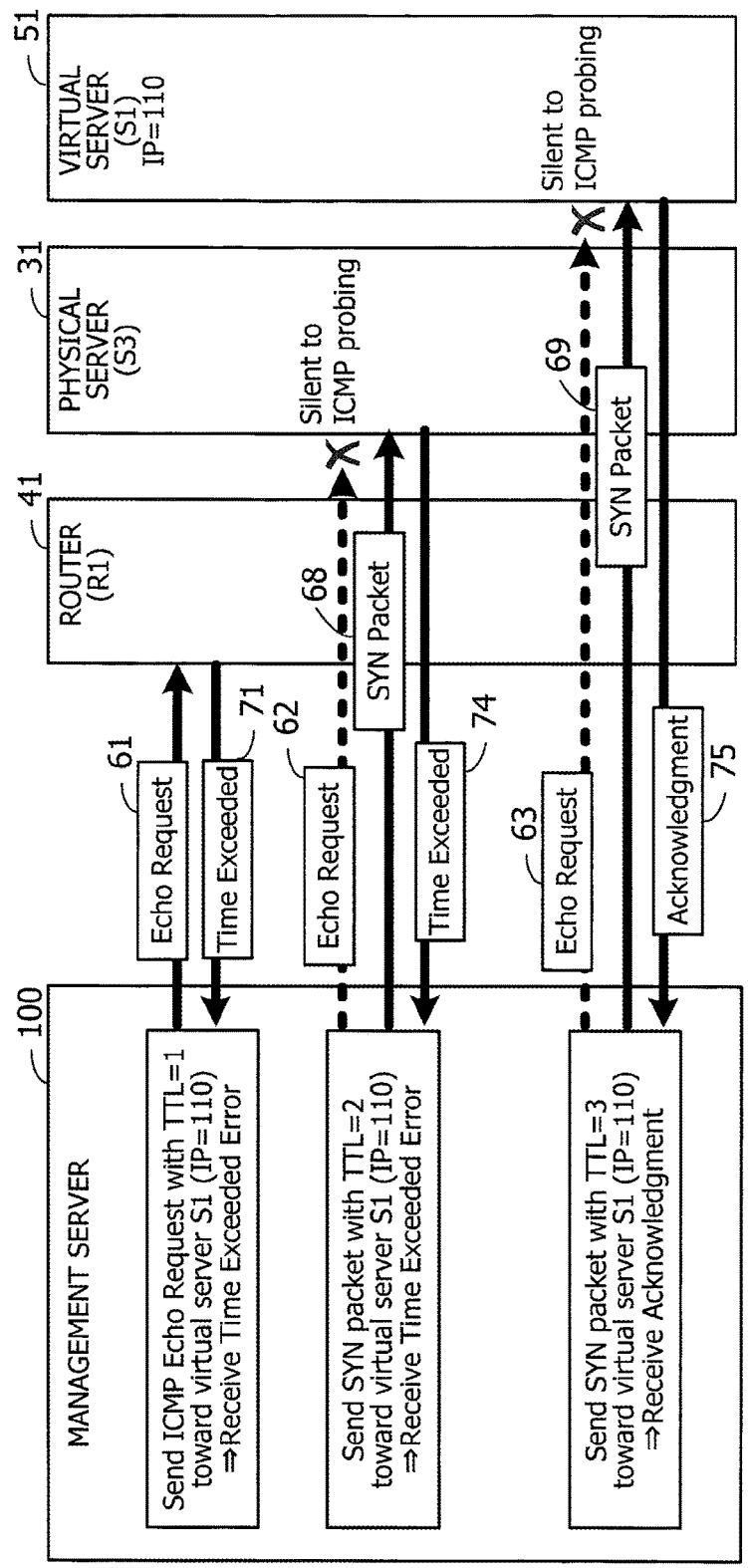
FIG. 11 illustrates an example of how SYN packets are used to obtain IP addresses.

FIG. 11 illustrates an example of how SYN packets are used to obtain IP addresses. The illustrated network includes the same nodes discussed in FIG. 10 and the management server 100 manages a virtual server 51. But it is assumed in FIG. 11 that the virtual server 51 and first physical server 31 are ICMP-silent (i.e., they do not respond to ICMP messages), whereas the router 41 is ICMP compatible.

The analyzing unit 140 in the management server 100 outputs an echo request 61 with TTL=1 toward the virtual server 51 of interest, and the router 41 responds to it with an error response 71 indicating "Time Exceeded." The analyzing unit 140 then outputs another echo request 62 with TTL=2 toward the same virtual server 51, but this echo request 62 is neglected by the physical server 31. Accordingly, the analyzing unit 140 transmits instead a SYN packet 68 with the same TTL value of 2. The physical server 31 now returns an error response 74 ("Time Exceeded") to the management server 100. The analyzing unit 140 further outputs an echo request 63 with TTL=3 toward the virtual server 51, but the virtual server 51 does not accept this echo request 63. Accordingly, the analyzing unit 140 transmits instead a SYN packet 69 with TTL=3. The virtual server 51 responds to it with an acknowledgment 75.

Each response message contains the source IP address, which allows the management server 100 to collect IP address of each intervening machine on the path to the managed virtual server 51. Even if some of those intervening machines are not allowed to receive ICMP messages, the use of SYN packets as an alternative enables the management server 100 to obtain their IP addresses.

Figure 12:
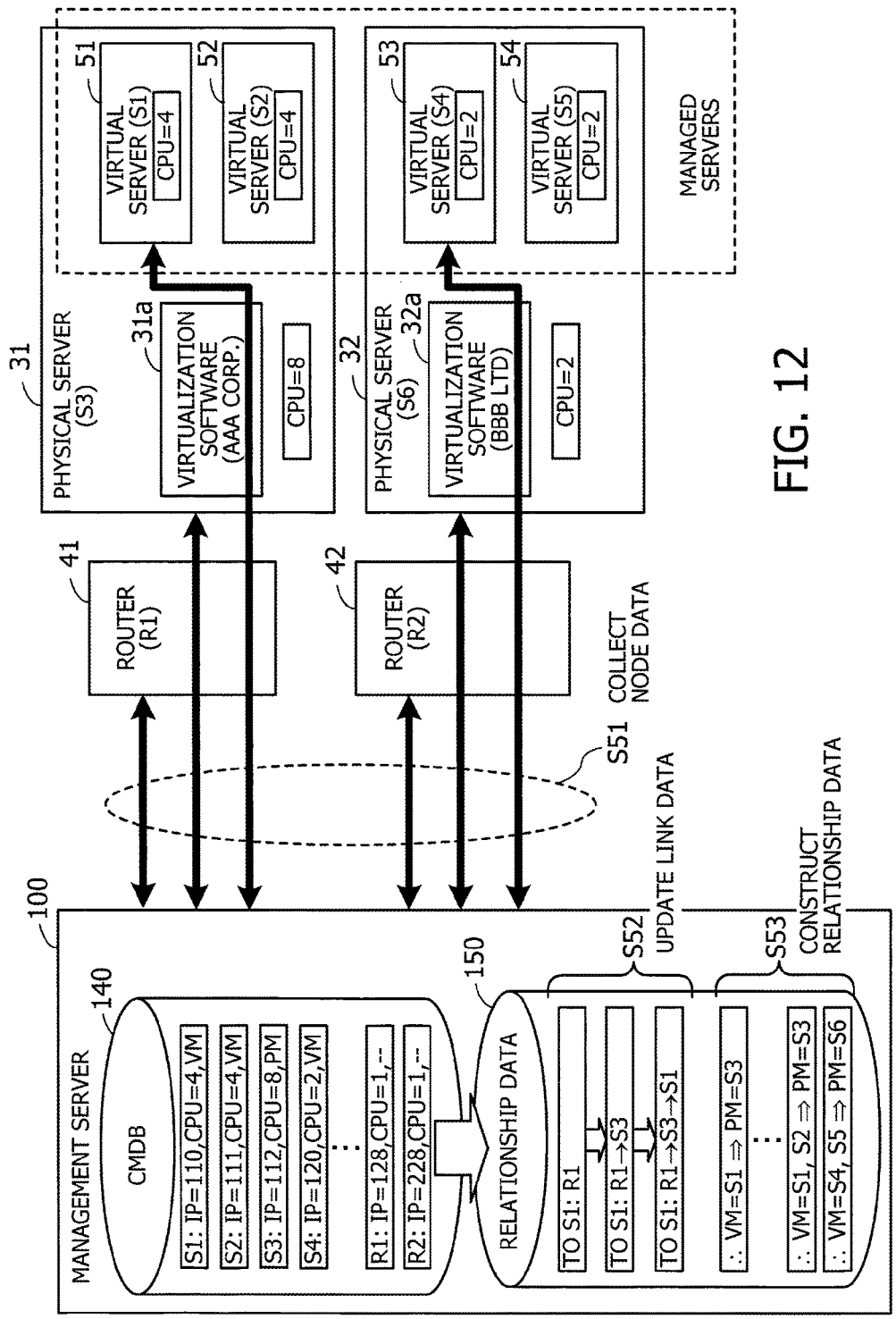
FIG. 12 illustrates an example of node data collection and relationship data construction.

Now that the IP address of each machine on the path is known, the management server 100 collects node data of those machines and constructs relationship data. FIG. 12 illustrates an example of node data collection and relationship data construction. With the obtained IP address of each machine, the management server 100 collects node data of those machines on the path (step S51). For example, the analyzing unit 140 collects CIs from the machines on the path by using their IP addresses and stores them in the CMDB 110. More specifically, the values collected as CIs include the following information:

(a) Node identity information (IP address, host name, ... )

(b) Machine type information (virtual server, or physical server, or router)

(c) The number of CPUs

After the collection of node data, the management server 100 creates and updates connection CIs (step S52) in preparation for construction of relationship data 150 that represents network relationships among the machines concerned. Each connection CI includes, as link data, an attribute representing a link indicated by a unique identifier, so that one machine's information will be associated with another machine's information. Take one virtual server 51 named "S1," for instance. The management server 100 sees node data collected from the router 41 and adds its host name "R1" to this record. The management server 100 then sees node data collected from the physical server 31 and adds its host name "S3" to the same record as a leg from the router 41. Further, the management server 100 sees node data collected from the virtual server 51 of interest and adds its host name "S1" to the same record as a leg from the physical server 31.

On the basis of the link data noted above, relationship data is constructed (step S53) to indicate a relationship between each managed virtual server and its corresponding host physical server.

Figure 13:
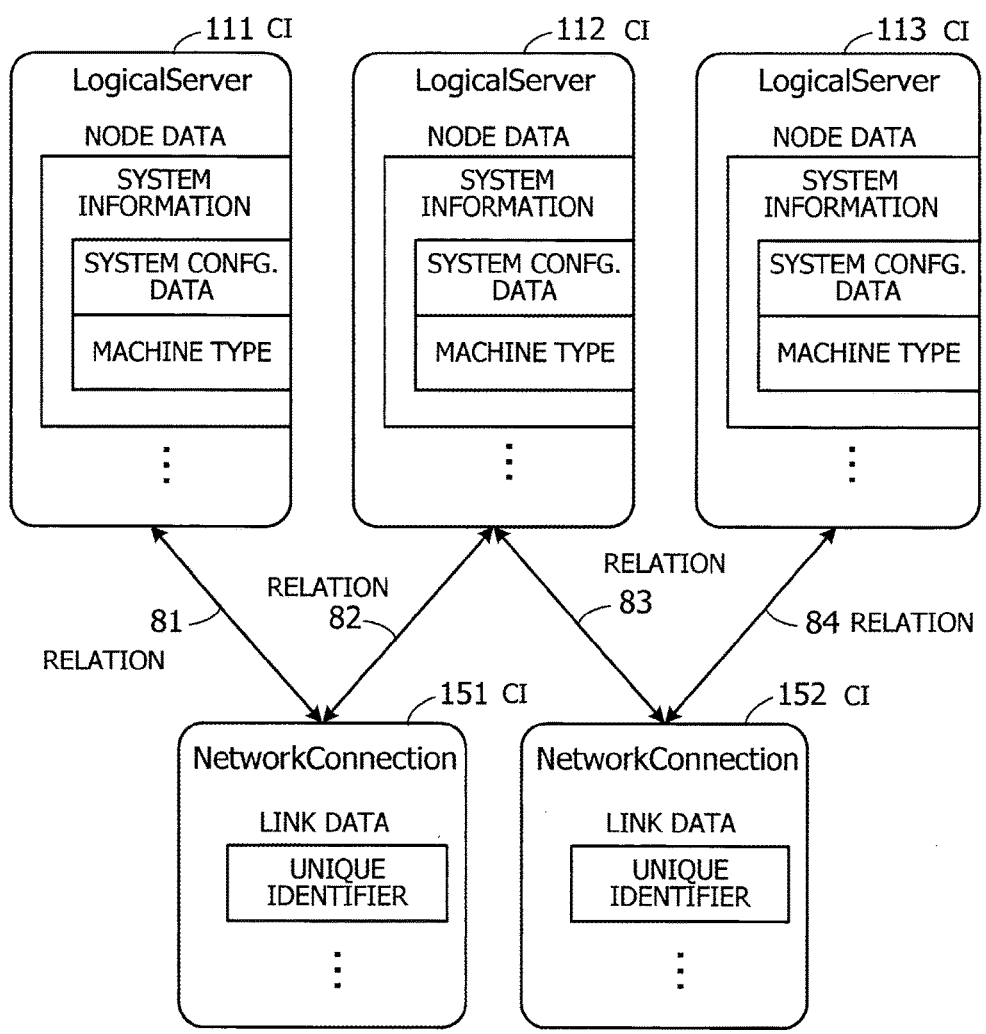
FIG. 13 illustrates configuration items interrelated by link data.

FIG. 13 illustrates CIs interrelated by link data. Specifically, FIG. 13 illustrates a group of CIs 111 to 113 for node data and another group of CIs 151 and 152 for link data. The node data CIs 111 to 113 contain system configuration data (including IP addresses) and machine type information, while the link data CIs 151 and 152 contain unique identifiers. The link data CIs 151 and 152 are associated with the node data CIs 111 to 113 via relations (inter-CI links) 81 to 84. The management server 100 may trace these relations 81 to 84, thereby finding which physical server is hosting which virtual server.

Figure 14:
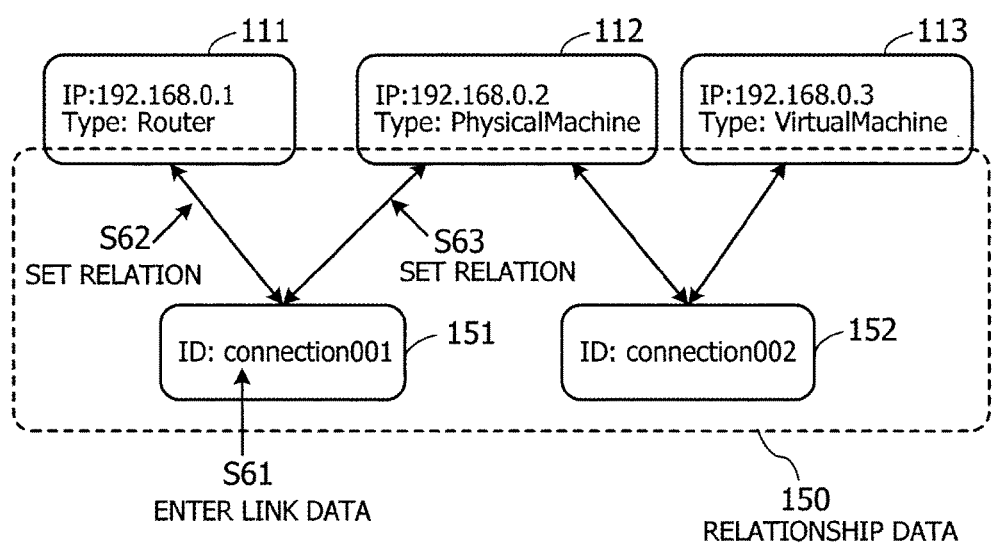
FIG. 14 illustrates an example of how relations are established between configuration items.

FIG. 14 illustrates an example of how relations are established between CIs. The analyzing unit 140 constructs relationship data for a network of machines as follows. When transmitting a packet (e.g., echo request or SYN packet) to a specific managed server, the analyzing unit 140 enters a piece of link data (e.g., unique identifier) into a CI 151 (step S61). Suppose now that a response is received from a node corresponding to the node data CI 112. Then the analyzing unit 140 adds a relation between the link data CI 151 and a node data CI 111 corresponding to the immediately preceding machine (step S62). Note that the node data CI 111 represents a router in the example of FIG. 14, but the beginning node data CI (not seen) actually corresponds to the management server 100. The analyzing unit 140 also adds a relation between the node data CI 112 of the responding node and the link data CI 151 most recently updated (step S63). Repeating these things will finally associate all nodes on the path via link data CIs.

More specifics of node data and link data will now be provided below. FIG. 15 illustrates an example of node data. The illustrated node data 91 includes elements defined in the fields of "Element Name," "Parent Element," and "Element Description." Each element includes components defined by a combination of "Component Name," "Component Type," "Component Description," "Data Type," and "Quantity" (# of).

As seen in FIG. 15, the node data 91 includes an IP address value as a component named "ipAddress" as part of an element named "LogicalServer." The node data 91 also indicates machine type as a component named "machineType" as part of an element named "LogicalServerConfiguration." The node data 91 also indicates the number of CPU cores as a component named "core" as part of an element named "LogicalCPU."

FIG. 16 illustrates an example of link data. The illustrated link data 92 describes a specific network connection as an element in the fields of "Element Name," "Parent Element," and "Element Description." The element contains a specific component described as a combination of: "Component Name," "Component Type," "Component Description," "Data Type," and "Quantity" (# of). The link data 92 includes a unique identifier as its component seen in FIG. 16.

Connections between nodes in the system have been analyzed as a collection of link data. The analyzing unit 140 now identifies which intervening physical server is the closest to the managed server of interest. This closest physical server is deemed to be hosting the managed server because, in general, every virtual server has its own underlying physical server and is accessed via an interface provided on that physical server. Specifically, the closest physical server is identified in the following way:

(a) Find out which machine is linked to the managed server of interest, with reference to link data in the CMDB 110.

(b) Determine whether the linked machine is a physical server, with reference to machine type information stored in the CMDB 110.

(c) If it is not a physical server (i.e., if it is an intervening virtual server), trace the relations backward toward the management server until a machine type of "Physical Server" is encountered.

When the host physical server in question is identified, the analyzing unit 140 then sees the number of CPU cores in that server. For example, the analyzing unit 140 extracts this number from the host physical server's node data (see FIG. 15) previously collected and stored in the CMDB 110.

The above-described method obtains information about the host physical server and its number of CPU cores without the need for sending queries to virtualization software. Note that the proposed method achieves the purpose no matter whether the closest to the managed virtual server is a physical server or a virtual server. Also note that the method can probe every intervening node on the path to the managed server even if some nodes are configured, for security reasons, to keep silence despite of incoming ICMP messages.

Figure 17:
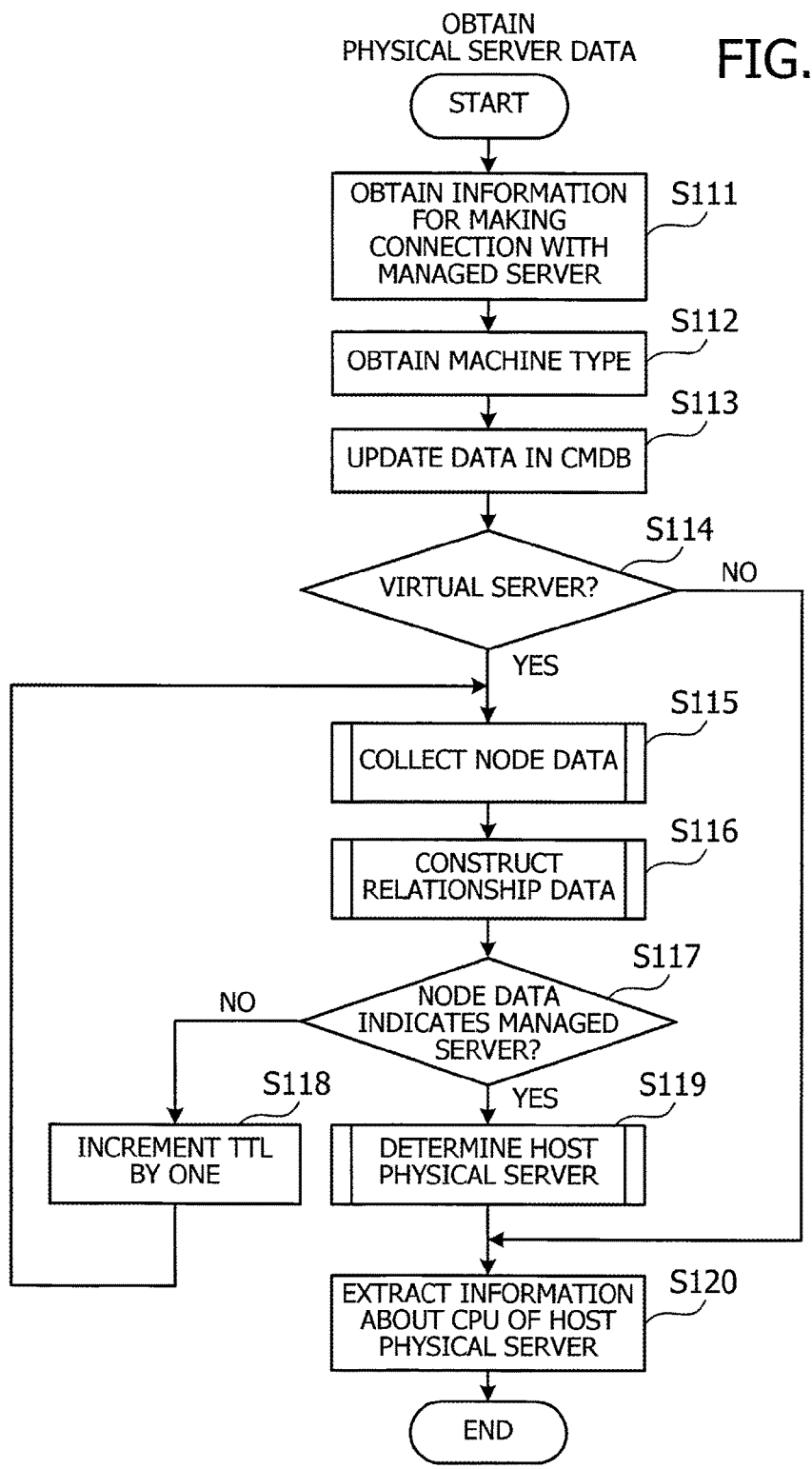
FIG. 17 illustrates an exemplary procedure of obtaining physical server data.

The following description will now provide details of how to obtain physical server data. FIG. 17 illustrates an exemplary procedure of obtaining physical server data.

(Step S111) The execution unit 130 analyzes the current operation flow and obtains information (e.g., IP address) for making a connection with the managed server of interest. The execution unit 130 sends a request to the analyzing unit 140 to obtain physical server data. This request specifies the obtained information for connection.

(Step S112) The analyzing unit 140 makes a connection with the managed server and receives its machine type information.

(Step S113) The analyzing unit 140 updates "LogicalServer" CI for the managed server in the CMDB 110.

(Step S114) The analyzing unit 140 determines whether the managed server is a virtual server. If it is a virtual server, the procedure advances to step S115. If not, the procedure skips to step S120.

(Step S115) The analyzing unit 140 calls a procedure of collecting node data. As will be described in detail later with reference to FIG. 18, the called procedure collects node data from one node on the path from the management server 100 to the managed server.

(Step S116) With the collected node data, the analyzing unit 140 calls a procedure of constructing relationship data. Details of this procedure will be described in detail later with reference to FIG. 19.

(Step S117) The analyzing unit 140 determines whether the collected node data is of the managed server of interest. If it is, the procedure advances to step S119. If not, the procedure proceeds to step S118.

(Step S118) The analyzing unit 140 increments TTL by one for a packet to be transmitted in the next cycle of node data collection. The procedure then goes to step S115.

(Step S119) The analyzing unit 140 calls a procedure of host physical server determination. As will be described in detail later with reference to FIG. 20, the called procedure identifies which physical server is hosting the managed virtual server.

(Step S120) The analyzing unit 140 extracts information about CPU of the identified physical server from a relevant "LogicalServer" CI in the CMDB 110. This information includes the number of CPU cores. The analyzing unit 140 sends the extracted CPU information to the execution unit 130.

The above process enables the execution unit 130 to obtain the number of CPU cores that the managed server is using. With this number of CPU cores, the analyzing unit 140 executes license management discussed in FIG. 6 as an execution permission test.

The following section will provide details of the node data collection procedure called in step S115 of FIG. 17. FIG. 18 is a flowchart illustrating an exemplary procedure of collecting node data.

(Step S131) The analyzing unit 140 transmits an ICMP echo request with the current TTL value to the managed server of interest.

(Step S132) The analyzing unit 140 determines what type of response has been received for the echo request. If it is an echo reply, the procedure goes to step S133. If the response indicates an error of "Time Exceeded," the procedure goes to step S138. If the response is a destination unreachable message, the procedure goes to step S134.

(Step S133) Since an echo reply has been received, the analyzing unit 140 sets a DONE flag to ON for the managed server. The procedure then moves to step S138.

(Step S134) Since a destination unreachable message has been received, the analyzing unit 140 consults the CMDB 110 to obtain a port number for a communication protocol that the management server 100 uses to communicate with the managed server.

(Step S135) The analyzing unit 140 transmits a TCP packet with the current TTL value and with a SYN flag set to one. This TCP packet is addressed to the protocol port obtained above for the managed server.

(Step S136) The analyzing unit 140 determines what type of response has been received for the transmitted TCP packet. If the response indicates an error of "Time Exceeded," the procedure goes to step S138. If the response is an echo reply, the procedure goes to step S137. If the response is a destination unreachable message, it means a failure of node data collection, and the present procedure of node data collection is terminated accordingly.

(Step S137) Since an echo reply has been received, the analyzing unit 140 sets a DONE flag to ON for the managed server.

(Step S138) The analyzing unit 140 obtains IP address of the responding node as path data for that node. For example, this IP address is obtained from the source IP address field in the header of the received response packet.

(Step S139) The analyzing unit 140 collects node data of the responding node. For example, the analyzing unit 140 transmits a request packet for node data to the IP address obtained in step S138. The destination node sends its node data back to the management server 100. The analyzing unit 140 stores the received node data into the CMDB 110 as a new "LogicalServer" CI.

(Step S140) The analyzing unit 140 assigns to variable #1 the path data (IP address) obtained in the previous execution of node data collection. Note that this variable #1 has initially contained IP address of the management server 100.

(Step S141) The analyzing unit 140 assigns to variable #2 the path data (IP address) obtained in the current execution of node data collection. The analyzing unit 140 then exits from this procedure.

The above procedure of FIG. 18 collects and returns node data corresponding to the current value of TTL. The analyzing unit 140 calls a procedure of relationship data construction each time a new piece of node data is collected. FIG. 19 is a flowchart illustrating an exemplary procedure of constructing relationship data.

(Step S151) The analyzing unit 140 produces a connection CI.

(Step S152) The analyzing unit 140 enters a unique identifier into the connection CI.

(Step S153) The analyzing unit 140 searches for a CI in the CMDB 110 using variable #1 representing path data of the immediately preceding node. Note that the term "immediately preceding node" means a node whose node data was obtained in the previous execution of the node data collection procedure.

(Step S154) The analyzing unit 140 produces a relation between the CI of the immediately preceding node and the connection CI produced in step S151.

(Step S155) The analyzing unit 140 searches for another CI in the CMDB 110 using variable #2 representing path data of the current node. Note that the term "current node" means a node whose node data has just been obtained in the current execution of the node data collection procedure.

(Step S156) The analyzing unit 140 produces a relation between the CI of the current node and the connection CI produced in step S151.

The relationship data begins with the management server 100 and grows as new pieces of node data are collected and incorporated, until it reaches the managed virtual server. This relationship data is then used to determine which physical server is hosting the virtual server of interest. FIG. 20 is a flowchart illustrating an exemplary procedure of determining host physical servers.

(Step S161) The analyzing unit 140 consults the CMDB 110 to read node data of the managed server.

(Step S162) The node data at hand corresponds to a CI in the relationship data 150, and that CI has a relation with a connection CI. The analyzing unit 140 retrieves this connection CI from the relationship data 150.

(Step S163) The analyzing unit 140 extracts the unique identifier of the retrieved connection CI.

(Step S164) Based on the extracted unique identifier of the connection CI, the analyzing unit 140 obtains node data of another CI related to the connection CI.

(Step S165) The analyzing unit 140 checks the machine type value in the node data at hand.

(Step S166) The analyzing unit 140 checks whether the machine type value is "Physical Machine." If it is, the procedure advances to step S167. If not, the procedure returns to step S162.

(Step S167) The analyzing unit 140 determines that the node corresponding to the node data at hand is the physical server hosting the managed virtual server. The analyzing unit 140 then exits from this procedure of host physical server determination.

The above procedure determines which physical machine is hosting a managed virtual server of interest. That is, virtual servers are deployed on a physical server, and a virtual server uses its underlying physical machine as part of a communication path with other machines in the outside area. It is therefore possible to obtain proper information about the host physical server in a real time manner by detecting a path to the managed virtual server of interest when starting an operation flow.

The proposed management server of the second embodiment is capable of detecting a host physical server within a limited are of the network, namely, a path to the managed server of interest. Since there is no need for creating a topology map of the entire network, the management server achieves the purpose with a smaller amount of processing resources.

In the second embodiment, the management server also constructs relations among node data in its CMDB on the basis of collected link data that connects machines on the network path to the managed server, during the course of associating physical servers with virtual servers. These relations associate the pieces of node data with one another, which are otherwise stored individually. The proposed method thus finds information about the host physical server without the need for sending queries to virtualization software.

The management server 100 of the second embodiment is configured to detect an ICMP-silent machine on the path to a managed server, on the basis of whether an ICMP message indicating "Time Exceeded" error is received or not. When such an ICMP-silent machine is present, the management server 100 transmits instead a SYN packet with a TTL value toward a protocol port for manipulation of the managed server. The machine in question then returns a response to this SYN packet, allowing the management server 100 to obtain path data of the machine. The management server 100 is thus able to figure out the network path even if the path includes ICMP-silent machines.

The above sections have exemplified several embodiments and their operations. The described components may be replaced with other components having equivalent functions or may include some additional components or processing operations. Where appropriate, two or more components and features of the above-described embodiments may be combined in different ways.

In one aspect of the embodiments discussed above, the proposed techniques make it possible to find out a physical computer currently hosting virtual computers.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing a program that causes a computer to perform a process comprising:
    transmitting a plurality of probe packets with different hop count limits to a remote computer of interest;
    producing path data that indicates a path from the computer to the remote computer, based on responses to the probe packets;
    obtaining type data from each of the remote computer and intervening computers on the path to the remote computer, the type data indicating whether each of the remote computer and intervening computers is a physical computer or a virtual computer created by virtualization software;
    selecting, when the type data indicates that the remote computer is the virtual computer, a physical computer that is located closest to the remote computer, of all physical computers on the path from the computer to the remote computer, based on the path data produced from the responses to the probe packets and the type data obtained from each of the remote computer and the intervening computers that are not the virtualization software; and
    determining the selected physical computer as a host physical computer that is hosting the remote computer.

2. The non-transitory computer-readable storage medium according to claim 1, wherein the transmitting transmits a plurality of probe packets whose hop count limits vary with a step size of one.

3. The non-transitory computer-readable storage medium according to claim 2, wherein the producing path data includes:
    producing a first path to a first responding computer that has responded to a first probe packet with a hop count limit of n, where n is an integer; and
    producing a second path to a second responding computer that has responded to a second probe packet with a hop count limit of (n+1), by adding to the first path a new leg from the first responding computer to the second responding computer.

4. The non-transitory computer-readable storage medium according to claim 1, wherein the probe packets are request packets for starting communication.

5. A management method comprising:
    transmitting, by a computer, a plurality of probe packets with different hop count limits to a remote computer of interest;
    producing, by the computer, path data that indicates a path from the computer to the remote computer, based on responses to the probe packets;
    obtaining, by the computer, type data from each of the remote computer and intervening computers on the path to the remote computer, the type data indicating whether each of the remote computer and intervening computers is a physical computer or a virtual computer created by virtualization software;
    selecting, by the computer, when the type data indicates that the remote computer is the virtual computer, a physical computer that is located closest to the remote computer, of all physical computers on the path from the computer to the remote computer, based on the path data produced from the responses to the probe packets and the type data obtained from each of the remote computer and the intervening computers that are not the virtualization software; and
    determining, by the computer, the selected physical computer as a host physical computer that is hosting the remote computer.

6. A management apparatus comprising:
    a memory; and
    a processor coupled to the memory, the processor being configured to:
        transmit a plurality of probe packets with different hop count limits to a remote computer of interest;
        produce path data that indicates a path from the management apparatus to the remote computer, based on responses to the probe packets;
        obtain type data from each of the remote computer and intervening computers on the path to the remote computer, the type data indicating whether each of the remote computer and intervening computers is a physical computer or a virtual computer created by virtualization software;
        select, when the type data indicates that the remote computer is the virtual computer, a physical computer that is located closest to the remote computer, of all physical computers on the path from the computer to the remote computer, based on the path data produced from the responses to the probe packets and the type data obtained from each of the remote computer and the intervening computers that are not the virtualization software; and
        determine the selected physical computer as a host physical computer that is hosting the remote computer.

* * * * *